US011288278B2

(12) United States Patent
Enders et al.

(10) Patent No.: US 11,288,278 B2
(45) Date of Patent: Mar. 29, 2022

(54) ANALYZING AND ANSWERING QUESTIONS

(71) Applicant: Mayo Foundation for Medical Education and Research, Rochester, MN (US)

(72) Inventors: Felicity Enders, Northfield, MN (US); Farrell J. Lloyd, Spring Valley, MN (US); Dale R. Zwart, Littleton, CO (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 16/511,486

(22) Filed: Jul. 15, 2019

(65) Prior Publication Data
US 2020/0004753 A1 Jan. 2, 2020

Related U.S. Application Data

(63) Continuation of application No. 14/491,841, filed on Sep. 19, 2014, now Pat. No. 10,353,904, which is a
(Continued)

(51) Int. Cl.
*G06F 16/2457* (2019.01)
*G06F 16/2458* (2019.01)
(Continued)

(52) U.S. Cl.
CPC .... *G06F 16/24578* (2019.01); *G06F 16/2477* (2019.01); *G06F 40/237* (2020.01); *G06F 40/30* (2020.01); *G06F 40/40* (2020.01)

(58) Field of Classification Search
CPC . G06F 16/24576; G06F 16/2477; G06F 40/30
See application file for complete search history.

(56) References Cited

U.S. PATENT DOCUMENTS 5,948,054 A 9/1999 Nielsen
5,953,704 A 9/1999 McIlroy et al.
(Continued)

OTHER PUBLICATIONS

International Search Report and Written Opinion for PCT/US2013/032965 dated Jul. 11, 2013, 7 pages.
(Continued)

*Primary Examiner* — Kannan Shanmugasundaram
(74) *Attorney, Agent, or Firm* — Fish & Richardson P.C.

(57) ABSTRACT

A computer-implemented method includes receiving, at a computer system, a question; identifying one or more first semantic elements in the question; selecting, from one or more electronic documents, a plurality of candidate responses to the question based on comparison of the one or more first semantic elements to second semantic elements; determining completeness scores for the plurality of candidate responses, wherein each of the completeness scores indicates how completely a corresponding candidate response from the plurality of candidate responses answers the question; determining relevance scores for the plurality of candidate responses, wherein each of the relevance scores indicates how relevant a corresponding candidate response from the plurality of candidate responses is to the question; and providing, by the computer system, at least a portion of the plurality of candidate responses based, at least in part, on the completeness scores and the relevance scores.

14 Claims, 16 Drawing Sheets

Related U.S. Application Data continuation of application No. PCT/US2013/032965, filed on Mar. 19, 2013.

(60) Provisional application No. 61/791,329, filed on Mar. 15, 2013, provisional application No. 61/612,652, filed on Mar. 19, 2012.

(51) Int. Cl.
*G06F 40/30* (2020.01)
*G06F 40/40* (2020.01)
*G06F 40/237* (2020.01)

(56) References Cited

U.S. PATENT DOCUMENTS

| | | | |
|---|---|---|---|
| 7,702,620 | B2 | 4/2010 | He et al. |
| 8,930,351 | B1 | 1/2015 | Kim et al. |
| 2007/0073683 | A1* | 3/2007 | Kobayashi ............ G06F 16/345 707/999.006 |
| 2007/0094183 | A1* | 4/2007 | Paek .................... G06F 16/334 706/45 |
| 2007/0029978 | A1 | 9/2007 | Myers |
| 2009/0287678 | A1 | 11/2009 | Brown et al. |
| 2009/0319495 | A1* | 12/2009 | Anderson ............ G06F 16/334 707/999.004 |
| 2011/0125734 | A1 | 5/2011 | Duboue et al. |
| 2012/0197939 | A1 | 8/2012 | Ben Shahar |
| 2013/0060763 | A1* | 3/2013 | Chica ................. G06F 16/9535 707/723 |
| 2013/0144890 | A1 | 6/2013 | Liu |
| 2015/0074095 | A1 | 3/2015 | Enders et al. |
| 2015/186537 | A1 | 7/2015 | Liu |

OTHER PUBLICATIONS

International Preliminary Report on Patentability for PCT/US2013/032965 dated Oct. 2, 2014, 6 pages.

* cited by examiner

ANALYZING AND ANSWERING QUESTIONS

CROSS-REFERENCE TO RELATED APPLICATIONS

This application is a continuation of U.S. application Ser. No. 14/491,841, filed Sep. 19, 2014 (now U.S. Pat. No. 10,353,904), which is a continuation and claims priority under 35 U.S.C. § 120 to PCT/US2013/032965, filed Mar. 19, 2013, which claims the benefit of U.S. Provisional Application Ser. No. 61/612,652, filed on Mar. 19, 2012, and U.S. Provisional Application Ser. No. 61/791,329, filed on Mar. 15, 2013. The disclosures of these prior applications are considered part of (and are incorporated by reference in) the disclosure of this application.

TECHNICAL FIELD

This document generally describes computer-based technology for analyzing and answering questions.

BACKGROUND

Computer systems have been created to provide results to questions, such as search queries and natural language questions. For example, a search engine can receive a search query and can provide a list of results (e.g., links to web pages) that the search engine has determined are likely to be relevant to the search query.

SUMMARY

This document describes computer-based techniques for analyzing and answering questions. Questions include any of a variety of requests for information, such as search queries and natural language questions. Two general aspects are disclosed. In a first general aspect, answers are provided to questions asked by users based on structured information sources (e.g., journal articles, frequently asked question (FAQ) repositories) and unstructured information sources (e.g., clinical guidelines). In a second general aspect, particular questions are posed to users and the answers provided by the users are analyzed to assess the users' knowledge regarding the subject matter of the questions. Both of these aspects can analyze questions and answers to identify semantic elements (word meanings) and can used those semantic elements to determine completeness, relevance, conciseness, and/or timeliness of a question and/or an answer. The described techniques can be used to analyze and answer questions with regard to a variety of topics, such as medical topics that draw from medical resources like evidence-based journal articles.

In some implementations, a computer-implemented method includes receiving, at a computer system, a question; identifying, by the computer system, one or more first semantic elements in the question; selecting, from one or more electronic documents, a plurality of candidate responses to the question based on comparison of the one or more first semantic elements to second semantic elements that have been identified in the plurality of candidate responses; determining completeness scores for the plurality of candidate responses, wherein each of the completeness scores indicates how completely a corresponding candidate response from the plurality of candidate responses answers the question; determining relevance scores for the plurality of candidate responses, wherein each of the relevance scores indicates how relevant a corresponding candidate response from the plurality of candidate responses is to the question; and providing, by the computer system, at least a portion of the plurality of candidate responses based, at least in part, on the completeness scores and the relevance scores.

One or more of the following features can optionally be included in such implementations. The method can also include ranking the plurality of candidate responses based, at least in part, on the completeness scores and the relevance scores; and the at least a portion of the plurality of candidate responses can be provided according to the ranking.

The method can also include determining conciseness scores for the plurality of candidate responses, wherein each of the conciseness scores indicates how succinctly a corresponding candidate response from the plurality of candidate responses answers the question; and the at least a portion of the plurality of candidate responses can be provided based further on the conciseness scores. For a particular conciseness score that corresponds to a particular candidate response from the plurality of candidate responses, the particular conciseness score can be determined based on i) a number of semantic elements that are in common between the particular candidate response and the question, and ii) a length of the particular candidate response.

The method can also include determining temporal scores for the plurality of candidate responses, wherein each of the temporal scores indicates how likely a corresponding candidate response is to reflect a current methodology associated with the question; and the at least a portion of the plurality of candidate responses can be provided based further on the temporal scores. For a particular temporal score that corresponds to a particular candidate response from the plurality of candidate responses the particular temporal score can be determined based on a date of authorship associated with the particular candidate response.

For a particular completeness score that corresponds to a particular candidate response from the plurality of candidate responses, the particular completeness score can be determined based on a comparison of i) a number of semantic elements that are in common between the particular candidate response and the question, and ii) a number of the one or more first semantic elements in the question. For a particular relevance score that corresponds to a particular candidate response from the plurality of candidate responses, the particular relevance score can be determined based on a comparison of i) a number of semantic elements that are in common between the particular candidate response and the question, and ii) a number of semantic elements in the particular candidate response. The question can relate to medicine and the one or more documents can be evidence-based medical articles; and the plurality of candidate responses can include portions of the evidence-based medical articles.

The method can also include receiving information that is associated with a user that submitted the question; determining a level of pre-existing knowledge that the user has with regard to the question based on the received information; and the plurality of candidate responses can be selected based on the determined level of pre-existing knowledge. The information can identify a role or title of the user within an organization or profession. The information can identify the user.

The method can also include identifying a key term in the question; and the one or more first semantic elements can be identified based on the identified key term. The method can also include categorizing the key term in one or more categories from of plurality of key term categories; associating one or more semantic elements that correspond to the key term with one or more weights based on the one or more categories; and the plurality of candidate responses can be selected based on the one or more weights that are associated with the one or more semantic elements that correspond to the key term. The plurality of key term categories can include a ranked list of key term categories that are ranked according to an associated priority with each category. The ranked list of key term categories can include a pathological process category, a treatment category, and a pharmacologic agent category.

The completeness scores and the relevance scores can be vectors that are combined into two-dimensional vectors; and the at least a portion of the plurality of candidate responses can be provided based on magnitudes and directions of the two-dimensional vectors. A particular completeness score for a particular candidate response can be determined based on a comparison of i) one or more semantic elements that are common between a) the particular candidate response and b) the question or synonyms of the question, and ii) all of the one or more first semantic elements in the question or the synonyms of the question. A particular completeness score for a particular candidate response can be determined based on a comparison of i) one or more semantic elements that are common between a) the particular candidate response and b) the question, synonyms of the question, or semantic elements that are implied by the question, and ii) all of the semantic elements in the question, the synonyms of the question, or the semantic elements that are implied by the question. A particular relevance score for a particular candidate response can be determined based on a comparison of i) one or more semantic elements that are common between a) the particular candidate response and b) the question or synonyms of the question, and ii) all of the semantic elements in the question. A particular relevance score for a particular candidate response can be determined based on a comparison of i) one or more semantic elements that are common between a) the particular candidate response and b) the question, synonyms of the question, or semantic elements that are implied by the question, and ii) all of the semantic elements in the question.

The method can also include providing a graph that plots the at least a portion of the plurality of candidate responses based on corresponding completeness scores and relevance scores, the graph can include at least a first region, a second region, a third region, and a fourth region, responses plotted within the first region can be identified as being highly likely to include the answer the question, responses plotted within the second region can be identified as possibly including the answer to the question and likely to include information that is irrelevant to the question, responses plotted within the third region can be identified as being abbreviated responses that do not fully answer the question, and responses plotted within the fourth region can be identified as being unlikely to include the answer to the question.

In some implementations, a computer-implemented method includes identifying, by a computer system, a question and an associated model answer; providing the question to a computing device; receiving a user-generated response to the question from the computing device; identifying one or more semantic elements contained in the user-generated response; determining a completeness score for the user-generated response based on a comparison of the one or more semantic elements in the user generated response and other semantic elements in the question or the model answer, wherein the completeness score indicates how completely the user-generated response answers the question; determining a relevance score for the user-generated response based on a comparison of the one or more semantic elements in the user generated response and the other semantic elements in the question or the model answer, wherein the relevance score indicates how relevant the user-generated response is to the question; and providing feedback to the computing device based, at least in part, on the determined completeness score and the determined relevance score for the user-generated response.

One or more of the following features can optionally be included in such implementations. The method can also include determining a complexity score for the question based on a comparison of the other semantic elements of the question and the model answer; determining a rarity score for the question that indicates how frequently the question is asked by a group users or arises in a field of practice associated with the question; and determining a level of difficulty for the question based on the determined complexity score and the determined rarity score; wherein the providing feedback includes providing information that indicates the level of difficulty of the question. The completeness score can be determined based on a comparison of i) one or more semantic elements that are common between a) the user-generated response and b) the model answer, the question, synonyms of the question, or synonyms of the model answer, and ii) all of the semantic elements in the model answer, the question, synonyms of the question, or synonyms of the model answer. The completeness score can be determined based on a comparison of i) one or more semantic elements that are common between a) the user-generated response and b) the model answer or synonyms of the model answer, and ii) all of the semantic elements in the model answer. The relevance score can be determined based on a comparison of i) all of the semantic elements from the user-generated response that are not contained in model answer and ii) all of the semantic elements in the model answer. The relevance score can be determined based on a comparison of i) all of the semantic elements from the user-generated response that are not contained in model answer or synonyms of the model answer and ii) all of the semantic elements in the model answer or the synonyms of the model answer.

The feedback can be a graphical chart that displays the completeness score and the relevance score of the user-generated response and that displays a scale that indicates a level of difficulty of the question. The feedback can be a graph that plots the user-generated response based on the completeness score and the relevance score, wherein the graph includes at least a first region, a second region, a third region, and a fourth region, wherein responses plotted within the first region are identified as being highly likely to include the answer the question, wherein responses plotted within the second region are identified as possibly including the answer to the question and likely to include information that is irrelevant to the question, wherein responses plotted within the third region are identified as being abbreviated responses that do not fully answer the question, and wherein responses plotted within the fourth region are identified as being unlikely to include the answer to the question.

The details of one or more implementations are set forth in the accompanying drawings and the description below. Various advantages can be provided by certain implementations. For example, a user's ability to find synthesized answers to questions can be improved. For instance, a physician can be provided with more concise, relevant, complete, and current answers to his/her questions using the most recent medical resources. In another example, specific content that directly addresses a user's question can be found when other search engines are not able to locate the correct answer. In a further example, content can be tailored to a particular user based on the user's preexisting knowledge of and training with regard to a particular topic. For instance, when answering questions from medical professionals, content can be tailored to a medical professional's background in a topic. For example, a generalist can be provided with an answer that includes additional background information on a topic that may be omitted from an answer on the same topic that is provided to a specialist in the field. In another example, gaps in a user's knowledge on particular topics can be identified and corrected. For instance, by posing questions to users and analyzing the answers that the users provide, gaps in the users' knowledge about a topic can be identified and corrected through subsequent training.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
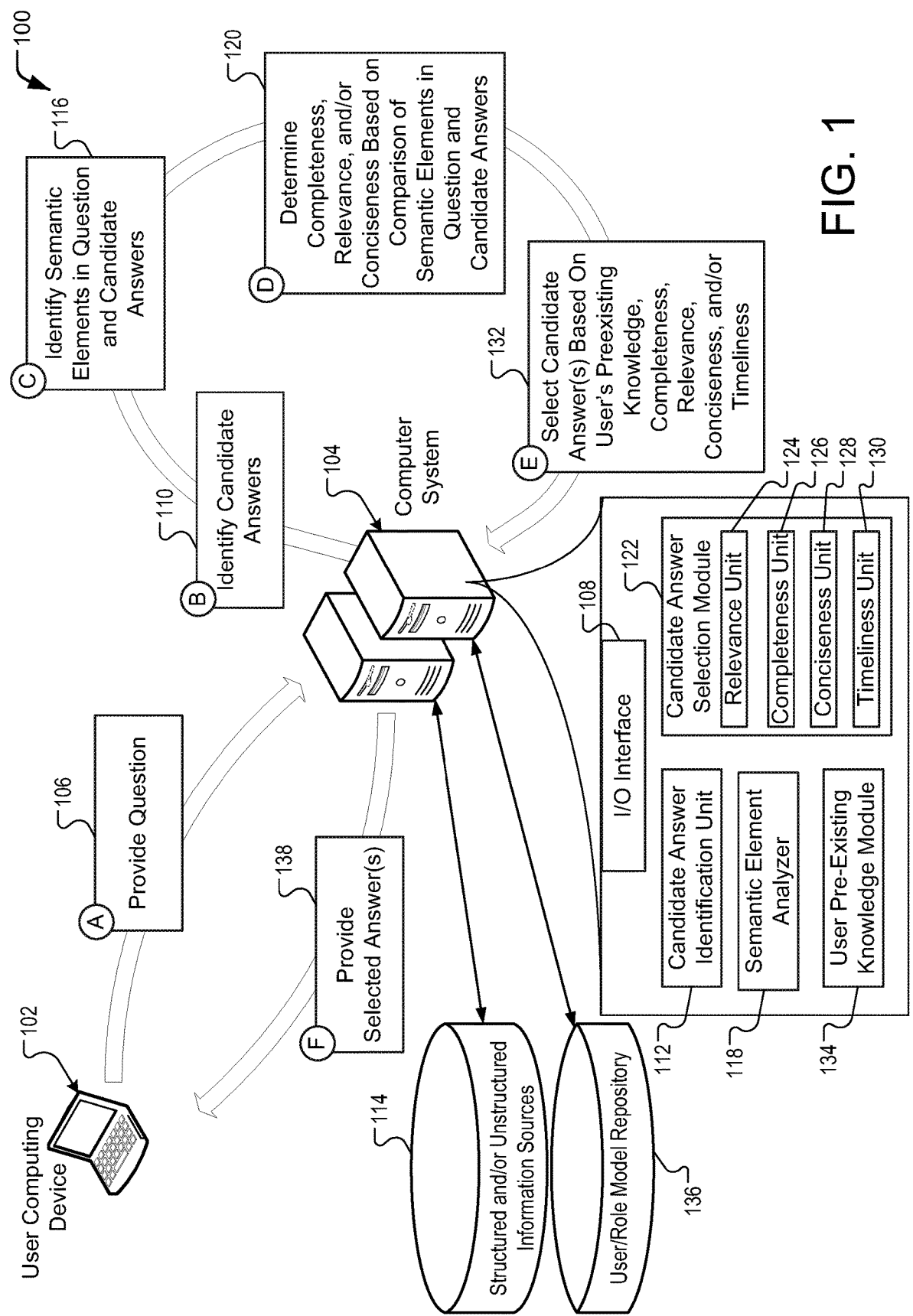
FIG. 1 is a conceptual diagram of an example computer system for identifying and providing information that answers a user's question.

This document describes computer-based techniques for analyzing and answering questions. Two general aspects are disclosed. In a first general aspect, answers are provided in response to user questions. In a second general aspect, users are prompted to answer questions and their answers are analyzed to determine how well they answered the questions. These two general aspects can use semantic processing of questions and answers to determine how well a particular answer addresses a question. Such semantic processing can include evaluating questions and answers based on a variety of factors, such as completeness, relevance, conciseness, and/or timeliness.

The first general aspect, which is described below with regard to FIGS. 1-6, can allow users to quickly locate current information that directly and concisely addresses their questions. For example, with ever increasing amounts of information available to users, it can be difficult for a user to quickly locate information that completely and concisely answers a particular question. For instance, a search engine may provide a user with a number of links to web pages that contain a variety of information on a particular topic, but such systems can leave the user with the task of sifting through all of this information to identify a portion that most directly answers the user's query. This can be particularly problematic in fields where users need quickly locate current information that directly addresses issues, such as in the medical profession.

The techniques described in this document with regard to the first general aspect allow users submit a question (e.g., natural language question, search query) to a computer system and to receive information in response that has been selected based on how relevant the information is to the question, how completely the information answers the question, how concisely the information answers the question, and/or how current (timely) the information is. This can allow a user to quickly locate current information that directly addresses the user's question without having to manually sift through extraneous/irrelevant information.

The second general aspect, which is described below with regard to FIGS. 7-10, can allow a user to identify gaps in their knowledge on a particular topic. For example, users can provide answers in response to questions posed by a computer system. Such a computer system can analyze user responses to these questions using one or more model answers and can identify, based on a variety of metrics like relevance and/or completeness, gaps in the user's knowledge.

As described below, the first and second general aspects can be implemented as part of the same computer system and can be interactive with each other. For example, questions asked by users as part of the first general aspect can be posed, with or without modifications, to users as questions in the second general aspect. Similarly, answers identified as completely and directly answering a user's question in the first general aspect can be used as model answers against which user answers are compared in the second general aspect.

FIG. 1 is a conceptual diagram of an example computer system 100 for identifying and providing information that answers a user's question. The depicted example computer system includes a user computing device 102 through which a user can submit a question and a computer system 104 that can identify an appropriate answer to the user's question.

The user computing device 102 can be any of a variety of appropriate computing devices, such as a laptop computer, a desktop computer, a tablet computing device, a smartphone, and/or personal digital assistant (PDA). The computer system 104 can be any of a variety of appropriate computer systems, such as a laptop computer, a desktop computer, and/or one or more computer servers (e.g., a cloud computing server system). The user computing device 102 and the computer system 104 can communicate over one or more networks (not depicted), such as the Internet, a local area network (LAN), a wide area network (WAN), a wifi network, a cellular network, a wireless data network (e.g., 3G/4G network), or any combination thereof. In some implementations, the user computing device 102 and the computer system 104 are part of the same computing device.

Through one or more interfaces (e.g., graphical user interface (GUI), audio interface) a user can submit a question to the user computing device 102. For example, the user computing device 102 can include a display that outputs a GUI with an input field into which a user can enter a question. As depicted by step A (106), the user computing device 102 can provide the question to the computer system 104.

The computer system 104 can receive the question from the user computing device 102 through an input/output (I/O) interface 108 of the computer system 104. The I/O interface 108 can be any of a variety of appropriate interfaces through which the computer system 104 can communicate with the user computing device 102 over one or more networks, such as an Ethernet card and/or a wireless transceiver.

As depicted by step B (110), the computer system 104 can identify candidate answers to the question in response to receiving the question from the user computing device 102. The computer system 104 can identify the candidate answers using a candidate answer identification unit 112 of the computer system 104. The candidate answer identification unit 112 can identify candidate answers from one or more structured and/or unstructured information sources 114 that are accessible to the computer system 104. The structured and/or unstructured information sources 114 can include any of a variety of information sources, such as a repository of journal articles, clinician guidelines, textbooks, and/or a repository of question and answer pairings (e.g., a frequently asked question (FAQ) repository). The structures and/or unstructured information sources 114 can include a variety of associated information that provides additional details regarding an information source, such as metadata, information that identifies analogous terms, information designates particular chunks of an information source, and/or information that brackets particular portions from an information source. The candidate answers can include entire electronic documents, such as an entire journal article, or portions thereof, such as a particular sentence or paragraph in a journal article.

As depicted in step C (116), the computer system 104 can identify one or more semantic elements in the question from the user computing device 102 and in the candidate answers. As discussed in greater detail below, a variety of techniques can be used to identify semantic elements, such as identifying a head or keyword in the question. In general, a semantic element is a word or phrase that represents something (e.g., an idea, an object, an action, a condition). The computer system 104 includes a semantic element analyzer 118 that identifies semantic elements in the question and/or the candidate answers. The semantic elements may be pre-identified for the candidate answers and may be stored by the one or more information sources 114.

As depicted by step D (120), the computer system 104 can determine the completeness, relevance, and/or conciseness of the candidate answers with regard to the question based on the identified semantic elements. The completeness of an answer with regard to a question can indicate a degree to which the candidate answer contains an actual answer to the question. For example, if a user submits the question "How do I change a bike tire?" and there is a first candidate answer that states "a tire can be changed by loosening the lug nuts with a wrench," the first answer will not be determined to be completely answer the question because it does not address the semantic element "bike" or any analogous terms in the question. In contrast, if a second answer states that "to change a bike tire you will need to remove the tire from the bike frame, replace the tube using tire levers, and then reattach the tire to the bike," the second answer will be determined to more completely answer the question because it addresses all of the semantic elements in the question.

The relevance of a candidate answer to the question can indicate whether the candidate answer is specific to the question, as a way to eliminate candidate answers that may include some or all semantic elements of an actual answer to the question but which are primarily focused on a different topic. Expanding upon the example in the previous paragraph, if the second candidate answer includes several additional sentences that review equipment to change bike tires and only includes the sentence noted above that actually discusses the process of changing a bike tire, the second candidate answer may be deemed to be less relevant because the majority of the answer pertains to a different topic (reviewing equipment) than the topic of the question (process of changing a bike tire). In contrast, a third candidate answer that includes only information discussing the steps for changing a bike tire can be determined to be more relevant than the second candidate answer because it is primarily focused on the same topic as the question.

The conciseness of a candidate answer indicates how succinctly the candidate answer answers the question. For example, if a first candidate answer includes all of the semantic elements of the question and is half as long as a second candidate answer that also includes all of the semantic elements of the question, then the first candidate answer can be determined to be more concise than the second candidate answer.

The completeness, relevance, and conciseness of the candidate answers can be determined by a candidate answer selection module 122. The candidate answer selection module 122 can include a relevance unit 124, a completeness unit 126, a conciseness unit 128, and a timeliness unit 130. The relevance unit 124 can determine the relevance of the candidate answers to the question from the user computing device 102 using one or more techniques described in greater detail below. The completeness unit 126 can determine the completeness of the candidate answers with regard to the question from the user computing device 102 using one or more of the techniques discussed below. The conciseness unit 128 can determine how concisely the candidate answers address the question from the user computing device 102. The timeliness unit 130 can determine how current the information contained in the candidate answers is using one or more of the techniques discussed below.

As depicted by step E (132), the computer system 104 can select one or more of the candidate answers to provide to the user computing device 102 based on one or more of a variety of factors, such as relevance, completeness, conciseness, timeliness, and/or preexisting knowledge of the user. The candidate answer selection module 122 of the computer system 104 can select one or more candidate answers so that a user is provided with the most relevant, complete, concise, and/or current answers. Furthermore, the candidate answer selection module 122 can select the one or more candidate answers so that the answer is at the right "knowledge level" for the user—meaning that the candidate answer contains sufficient background information so that the user can understand the answer while not containing too much background information that the user already knows. For instance, a generalist may need background information on the chemical properties and research associated with a particular drug to understand an answer to a question regarding the drug, whereas as pharmacologist may not need such information and may instead find such information to be a hindrance in quickly obtaining the answer.

The computer system 104 can include a user pre-existing knowledge module 134 that can determine a level of pre-existing knowledge of the user of the user computing device 102 based on information that identifies the user and/or a role/professional title of the user with an organization. The user pre-existing knowledge module 134 can use models of user knowledge that are stored in user/role model repository 136. The models stored in the repository 136 can indicate areas of specialized knowledge for a particular user and/or for particular user roles/professional titles (e.g., doctor, administrator, specialist in a particular field, generalist). For example, a model for a cardiologist may identify a number of heart-related topics for which a user with that title has specialized knowledge. In another example, a model for a particular user who did a fellowship in sports medicine may indicate that the user has specialized knowledge on sports medicine-related topics. The candidate answer selection module 122 can select one or more of the candidate answers based, at least in part, on the level of preexisting knowledge of the user of the computing device 102 as determined by the user pre-existing knowledge module 134.

As indicated by step F (138), the computer system 104 can provide the one or more selected candidate answers to the user computing device 102. The user computing device 102 can present the one or more selected candidate answers to the user, such as visually on a display of the user computing device 102 and/or audibly through one or more speakers of the user computing device 102.

The units and modules 112, 118, 122-130, and/or 134 of the computer system 104 can be implemented in software, firmware, hardware, or any combination thereof.

Figure 2:
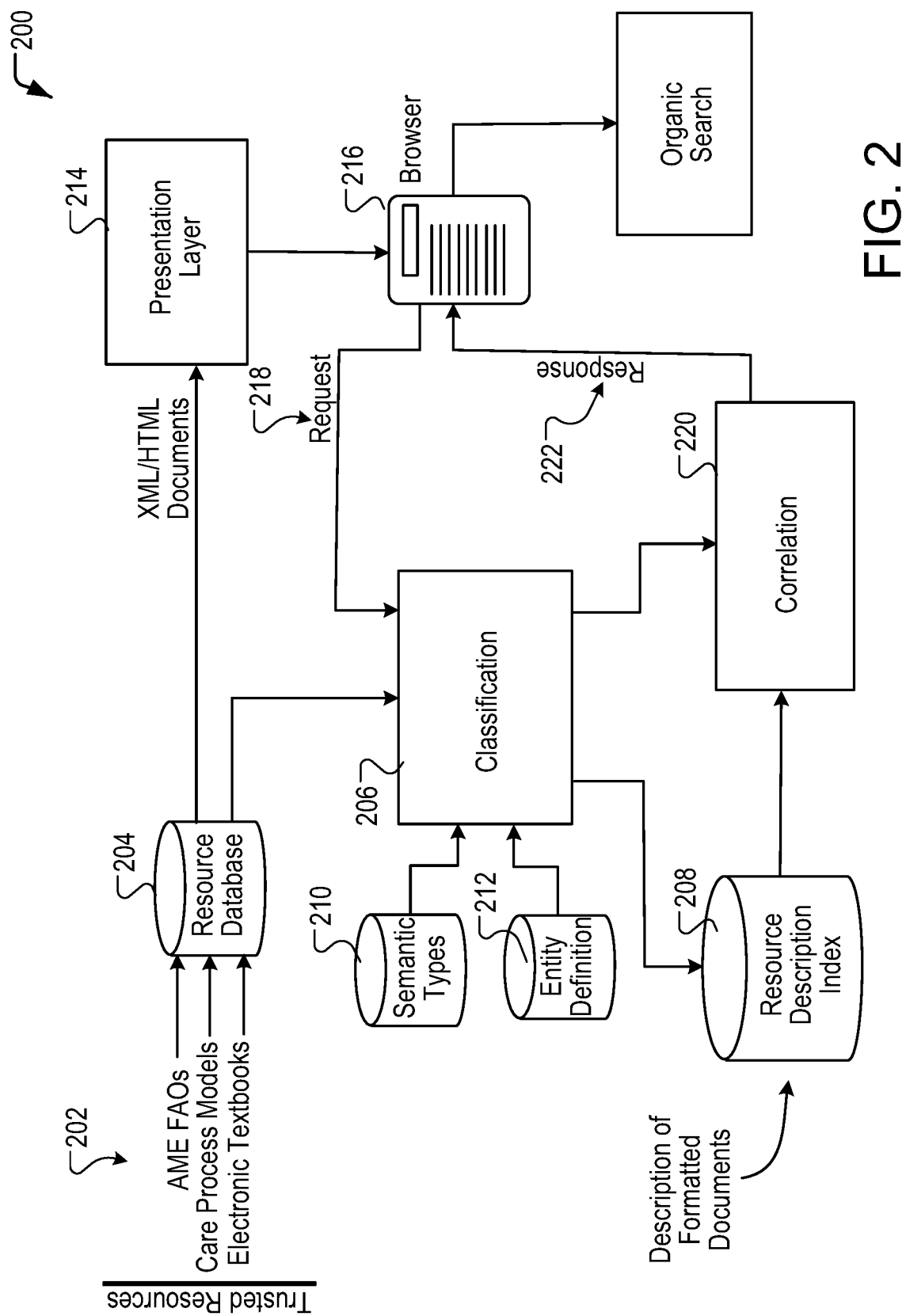
FIG. 2 depicts an example computer system for providing answers to user questions.

FIG. 2 depicts an example computer system 200 for providing answers to user questions. The example computer system 200 can be implemented by one or more computing devices, such as the computing device 102 and/or computer system 104 discussed above with regard to FIG. 1. The system 200 depicts components and interaction among the components to perform two general tasks: preprocessing of resources in preparation to answer questions and answering questions.

Regarding preprocessing, the system 200 stores information from trusted resources 202 in a resource database 204. Trusted resources 202 can include any of a variety of resources that have a reputation for providing reliable and verifiable information. For instance, in an example medical implementation that is depicted in FIG. 2, the trusted resources 202 can include frequently asked questions from a trusted source (e.g., a FAQ from a trusted medical organization), medical textbooks, clinical guidelines, and/or case process models. Such trusted resources can be in a variety of formats, such as structured formats with XML/HTML tags that identify different portions of the resource and unstructured formats without XML/HTML tags. Unstructured information, such as plain text and WORD documents, can be converted to structured information (e.g., adding heading tags, block tags) before it is added to the resource database 204.

A classification module 206 can read documents stored in the resource database 204 to identify resource blocks within the documents (e.g., portions of the document dealing with different topics) and can extract semantic elements from the identified resource blocks for storage in a resource description index 208. A particular document may contain multiple resource blocks. Resource blocks can be identified as portions of a resource that are identified as being long enough to contain critical related ideas while being concise. As described in greater detail below, the resource description index 208 can be used to identify candidate answers (e.g., resource blocks) for a particular question based on semantic elements.

The classification module 206 can identify semantic elements (e.g., terms within the content, meaning of words) within the resources stored in the resource database 204. The classification module 206 can also identify modifier words within the content, such as "not" and "always." The classification module 206 can break long content into smaller chunks, or resource blocks, which are long enough to contain critical related ideas while being concise. As part of breaking content into smaller chunks, the classification module 206 can preserve the context within which the resource blocks are identified by associating resource blocks with contextual information, such as links between "parent" information and smaller chunks of "child" information. Such contextual information can also be stored in the resource database index 208. An example technique for classifying resources is described below with regard to FIG. 3.

The classification module 206 can add semantic elements (e.g., words and phrases) to the resource description index 208 with additional metadata describing the use of the semantic elements in particular resource blocks. For example, the classification module 206 can add information that identifies the frequency with which particular semantic elements occur in particular resource blocks. In another example, the classification module 206 can identify semantic types (e.g., qualitative, functional, disease, organ, therapeutic, pharmacologic, pathologic, food) for semantic elements and can include the identified semantic type information in the resource description index 208. The classification module 206 can use a semantic type database 210 that stores information associating particular semantic elements with different semantic types. The associations in the semantic type database 210 may be specific to one or more fields, such as medicine. Similarly, the resulting resource description index 208 may be specific to one or more fields, such as medicine. The classification module 206 may also identify named entities in resource blocks using an entity definition database 212 and may add information associated with such named entities to the resource description index 208.

For example, the classification module 206 can identify the following example text from a document (e.g., journal article, FAQ) as being a resource block and can add the entries depicted in Table 1 below to the resource description index 208 for the resource block:

Atrial Fibrillation

Atrial fibrillation describes an irregular and often rapid heart rhythm. The irregular rhythm, or arrhythmia, results from abnormal electrical impulses in the heart. The irregularity can be continuous, or it can come and go. Aspirin and warfarin, along with dietary modifications are appropriate therapies for this condition.

Example Text

TABLE 1

| Term | Frequency | Semantic Type |
|---|---|---|
| abnormal | 1 | Qualitative |
| arrhythmia | 1 | Pathologic |
| aspirin | 1 | Pharmacologic |
| atrial | 3 | Organ |
| atrial fibrillation | 3 | Pathologic |
| condition | 1 | Qualitative |
| continuous | 1 | Temporal |
| dietary | 1 | Food |
| dietary modifications | 1 | Therapeutic |
| electrical | 1 | Functional |
| fibrillation | 3 | Disease |
| heart | 2 | Organ |
| heart rhythm | 1 | Functional |
| irregular | 2 | Qualitative |
| rapid | 1 | Qualitative |
| results | 1 | Functional |
| therapies | 1 | Therapeutic |
| warfarin | 1 | Pharmacologic |

The semantic types are determined using the semantic types database 201. For example, the semantic element "irregular" is identified in this example as a "qualitative" element that indicates that the next noun in a phrase is not normal, such as in the phrase "an irregular heartbeat."

The computer system 200 includes a presentation layer 214 that can serve electronic documents to a client computing device, such as the client computing device 102 described above with regard to FIG. 1. The electronic documents can include content that is formatted for presentation by one or more applications on the client device, such as content formatted in a mark-up language (e.g., XML, HTML) for presentation on the client computing device by a browser application 216. The content can include one or more input fields through which a user of the client computing device can submit an information request 218. The information request 218 can take any of a variety of appropriate forms for information requests, such as a natural language question (e.g., "how do I treat suspected ACS?"), one or more keywords (e.g., ACS treatment), and/or phrase (e.g., "acute coronary syndrome"). The information request 218 can be received over one or more networks by the classification module 206.

The information request 218 can be parsed by the classification module 206. Parsing can involve one or more of the following: stemming (reducing words to root form, such as reducing "lacerations" to "laceration"), n-grams (n words in a sequence which have greater meaning than other words in the sequence, such as the term "heart" in the sequence "congenital heart disease"), interrogative identification (extracts query wording, such as "how would I determine . . . "), and/or removing stop words (terms that may skew query results because they are insignificant or common, such as articles and prepositions). In some Interrogatives in the information request 218 can be labeled according to their cognitive level by the classification module 206, such as according to Bloom's Taxonomy. For example, the question "what is . . . " can be labeled as pertaining to knowledge (bottom level of Bloom's Taxonomy). In contrast, the question "how do I treat . . . " can be labeled as concerning the application of and comprehension of knowledge (third level of Bloom's Taxonomy).

The classification module 206 can further parse the information request 218 into semantic elements (terms or phrases within the information request 218, or meaning of the terms or phrases). The classification module 206 may use a semantic vocabulary to identify the semantic elements in the information request 218. The classification module 206 can also identify modifier words in the information request 218, such as "not" and "always." The classification module 206 can also associate some or all of the identified semantic elements with synonyms for from a known/trusted resource, such as one or more of the resources stored in the resource database 204. The classification module 206 can also resolve acronyms and/or abbreviations that are included in the information request 218.

With the information request 218 parsed and the various portions of the information request 218 identified, the classification module 206 can proceed to identify a "key term" or "head word" for the information request 218. The key/head term can be a term that is the most relevant to the information request 218. Other semantic elements in the information request 218 can be labeled as "trunk words." Identification of the key/head term can be performed using one or more predetermined term priorities. For example, example priorities in a medical implementation include: first identifying whether there is a pathological process included in or implied by the information request 218, such as a disease or pregnancy; second identifying whether a treatment is described or implied by the information request 218, but no pathological process; and third identifying whether there is a pharmacologic agent either described or implied by the information request 218, but no pathological process or treatment. For example, with an information request "atrial fibrillation warfarin," the phrase "atrial fibrillation" can be identified as the key/head word and the term "warfarin" can be identified as a trunk word.

Together, key/head terms and trunk words can be used by the classification module 206 to form a search query. Once the terms have been fully parsed, the classification module 206 can submit each key/head term and trunk word for the query to the resource description index 208 to determine a score for the query with regard to at least a portion of the resources included in the resource database 204 and for which classifications exist in the resource description index 208. The scores can be based on the frequencies associated with the semantic elements for the resources as indicated in the resource description index 208. For example, a score for the query "atrial fibrillation warfarin" with regard to a particular resource can be determined using the following equation: $q=(c1_q)$ as score1, $(p1_q)$ as score2, where q is a vector that represents the score for the query with regard to the particular resource, $c1_q$=Condition (atrial fibrillation), and $p1_q$=Pharmacologic (warfarin). A list of candidate answers can be identified from this query and provided to the correlation module 220 to identify one or more answers to return to the client computing device for presentation in the browser 216.

In some implementations, Bloom's Taxonomy (and/or other known hierarchies) can be used to add alternate verbs for the information request 218 so as to create a unique alternate question for each level of Bloom's Taxonomy (and/or other known hierarchies). The answers associated with each alternate question can be presented to the user as alternate answer sets.

In some implementations, the level of the information request 218 can be identified with respect to Bloom's Taxonomy (and/or other known hierarchies) and can be stored with information about the user and with the field of inquiry associated with the information request 218 (e.g., the medical area associated with the information request 218). This stored information can be used to identify the level of Bloom's Taxonomy (and/or other hierarchies) to add to future information requests by the user for the same field of inquiry (e.g., the same medical area). Alternate answers can be included from one level above and one level below the user's prior established level for the same field of inquiry (e.g., the same medical area). Feedback can be provided to the user regarding the level of the information request 218 in the various fields of inquiry and/or with regard to variations over time.

In some implementations, a version of the information request 218 can be encoded and saved based on the semantic elements in the information request together with the identified key/head term. This encoded information can be used over time to assess the frequency with which the information request is asked by various users (e.g., all users, particular users from various medical areas) to identify which questions are asked more and less frequently.

To identify the best answer from among the candidate answers, a variety of techniques can be used to eliminate some of the candidate answers (e.g., resource blocks) that are not likely to be the best answer. For example, candidate answers that do not contain the key/head term for the information request 218 can be eliminated. In another example, candidate answers can be eliminated based on the user's role and/or background (e.g., specialist vs. generalist, areas in which the user works, clinical notes written by this user and/or user's answers to questions in order to determine the level of the user's preexisting knowledge), the presence of key/head terms in the candidate answers, and/or whether the candidate answer includes text describing the current state of knowledge/practice and also includes the key/head term.

Using the candidate answers that have not yet been eliminated, the correlation module 220 can further processes the remaining candidate answers based on a variety of factors, such as relevance, completeness, conciseness, and/or timeliness. Completeness indicates the degree to which a candidate answer directly relates to the user's information request 218. Relevance indicates the degree to which a candidate answer is focused directly upon the user's information request 218. Conciseness indicates the degree to which a candidate answer can be processed in a short period of time by a user. Timeliness indicates how likely a candidate answer is to reflect the most recent/current information regarding practice in a field.

A candidate answer (e.g., one or more resource blocks) can be determined to be complete by the correlation module 220 if it includes all the terms or synonyms included in or implied by the user's information request 218, role, and/or background. Completeness can be a range and can be determined in a variety of ways. In a first example, a completeness score for a candidate answer is determined based on (the semantic elements that are common between the candidate answer and the (information request 218 and/or synonyms)) compared to (all the semantic elements in the (information request 218 and/or synonyms)).

In a second example, a completeness score for a candidate answer is determined based on (the semantic elements that are common between the candidate answer and the information request 218) compared to (all the semantic elements in the information request 218).

In a third example, a completeness score for a candidate answer is determined based on (the semantic elements that are common between the candidate answer and the (information request 218 and/or synonyms)) compared to (all the semantic elements in the information request 218).

In a fourth example, a completeness score for a candidate answer is determined based on (the semantic elements that are common between the candidate answer and the (information request 218, synonyms, and/or elements implied by the information request 218)) compared to (all the semantic elements in the information request 218 and/or implied by the information request 218).

In a fifth example, a completeness score for a candidate answer is determined based on (the semantic elements that are common between the candidate answer and the (information request 218 and/or elements implied by the information request 218)) compared to (all the semantic elements in the information request 218 and/or implied by the information request 218).

In a sixth example, a completeness score for a candidate answer is determined based on (the semantic elements that are common between the candidate answer and the (information request 218, synonyms, and/or elements implied by the information request 218)) compared to (all the semantic elements in the (information request 218, synonyms, and/or implied by the information request 218)).

The correlation module 220 can determine whether a candidate answer is relevant to the information request 218 if the candidate answer is primarily focused upon the terms and/or synonyms included in and/or implied by the user's information request 218, role, and/or background. Relevance scores for the candidate answers can be determined in a variety of ways by the correlation module 220. In a first example, a relevance score for a candidate answer is determined based on (the semantic elements that are common between the candidate and the (information request 218 and/or synonyms)) compared to (all the semantic elements in the candidate answer).

In a second example, a relevance score for a candidate answer is determined based on (the semantic elements that are common between the candidate answer and the information request 218) compared to (all the semantic elements in the candidate answer).

In a third example, a relevance score for a candidate answer is determined based on (the semantic elements that are common between the candidate answer and the (information request 218, synonyms, and/or implied by the information request 218)) compared to (all the semantic elements in the candidate answer).

The correlation module 220 can determine the conciseness of candidate answers based on a variety of factors, such as a logistic regression model predicting whether an answer is viewed as concise based upon objective measures found in many or all text-based medical answers to questions. In another example, one candidate answer can be determined to be more concise than another if it is shorter and includes a greater proportion content likely to be interpreted as the critical information needed to make an ideal decision, the "gist," by users including content such as tables, images, videos, formatted text, journal articles, clinician guidelines, textbooks, and/or a repository of question and answer pairings (e.g., a FAQ repository).

The correlation module 220 can determine the timeliness of candidate answers based one or more timestamps associated with the information contained in the candidate answer. For example, one candidate answer can be determined to be more timely than another block if it has been developed or approved more recently.

The correlation module 220 can filter and/or rank (order) the candidate answers based on the completeness scores, relevance scores, conciseness scores, and/or temporal scores (timeliness scores). One or more of the top ranking candidate answers can be included in a response 222 that is provided to the client computing device for presentation in the browser 216.

Figure 3:
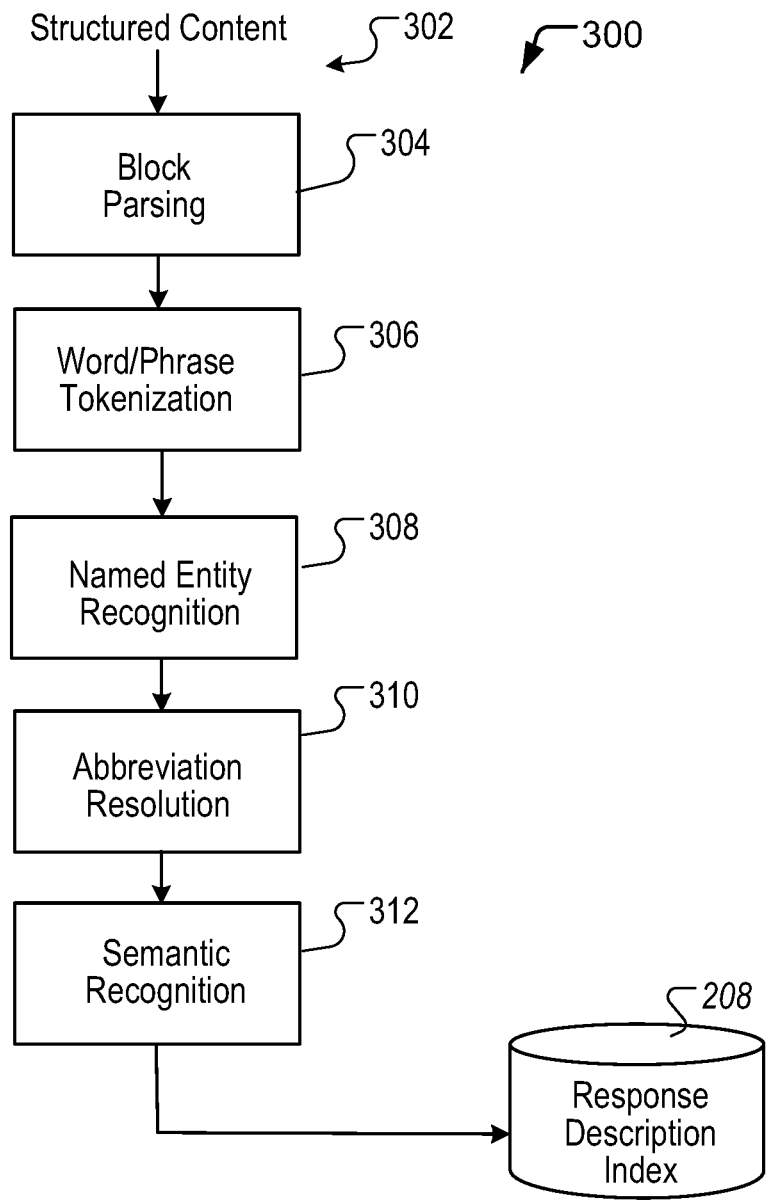
FIG. 3 is a flowchart depicting an example method for classifying content for inclusion in a resource description index.

FIG. 3 is a flowchart depicting an example method 300 for classifying content for inclusion in a resource description index, such as the resource description index 218. The example method 300 can be performed by any of a variety of appropriate computer systems, such as the computer system 200.

The method 300 begins with structured content 302 being provided to a classification module, such as the classification module 206 described above with regard to FIG. 2. The structured content 302 is then block parsed, where the content is broken down into related information blocks (304). Each block is broken down into individual words and phrases (306) which are compared to a reference vocabulary to identify entities (308) and to resolve abbreviations (310). Each term is compared to a semantic vocabulary to identify the meaning of words and phrases (312). The resulting terms are then provided to and stored in the resource description index 208.

Figure 4:
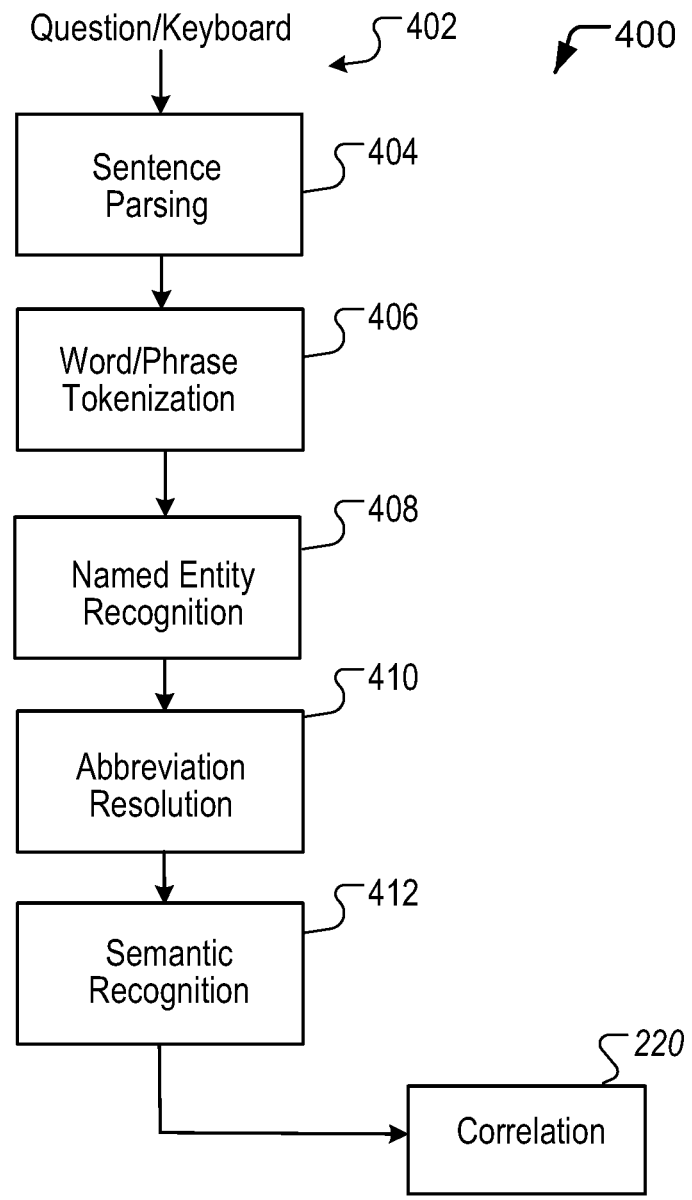
FIG. 4 is a flowchart depicting an example method for classifying questions for used by a correlation module to use to identify and provide an answer to a question.

FIG. 4 is a flowchart depicting an example method 400 for classifying questions for used by a correlation module, such as the correlation module 220, to use to identify and provide an answer to a question. The example method 400 can be performed by any of a variety of appropriate computer systems, such as the computer system 200.

The method 400 begins with a question/keyword 402 being received and parsed (404). The question/keyword 402 is broken down into individual words and phrases (406) which are compared to a reference vocabulary to identify entities (408) and to resolve abbreviations (410). Each term is compared to a semantic vocabulary to identify the meaning of words and phrases (412). The resulting terms are then provided to the correlation module 220 to use to identify an answer to the question/keyword 402.

Figure 5:
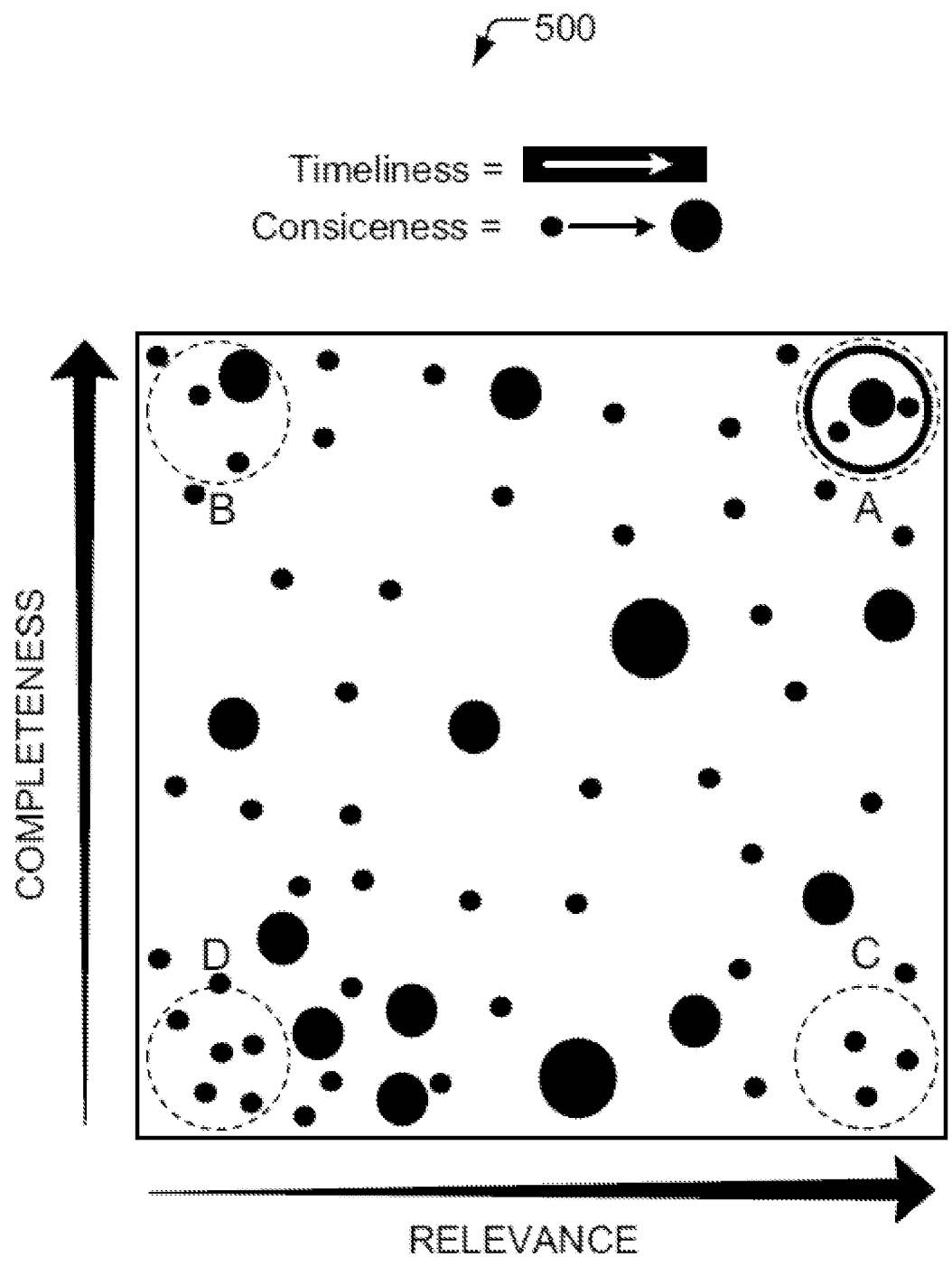
FIG. 5 is a graph that depicts an example distribution of candidate answers according to their completeness, relevance, conciseness, and timeliness with regard to a particular question.

FIG. 5 is a graph 500 that depicts an example distribution of candidate answers according to their completeness, relevance, conciseness, and timeliness with regard to a particular question. Such determinations can be made by an of a variety of computer systems, such as the computer system 104 described above with regard to FIG. 1 and/or the computer system 200 described above with regard to FIG. 2.

The graph 500 includes four identified regions A-D. In region A, responses are both complete and relevant—highly likely to include the answer to a question that has been posed by a user. In region B, responses are complete but contain a large amount of irrelevant concepts—may include the answer but may be focused on topic other than the topic of the user's question. In region C, responses are almost totally incomplete but contain relevance concepts—likely to be overly abbreviated responses. In region D, responses are almost totally incomplete and contain a large amount of irrelevant concepts—not likely to answer the user's question.

Based on the distribution of completeness scores and relevance scores for candidate answers, a computer system (e.g., the computer system 104, the computer system 200) can provide as output an ordered list of likely answers to a user's specific question. To identify the set of potential answers to a specific user's question, such a computer system can do a first pass on the set of candidate answers by selecting electronic documents (e.g., journal articles, FAQs) that include the key term identified from the user's question and/or associated trunk words. As discussed above, an electronic document can include multiple content resource blocks which can each be considered to be a candidate answer. A second pass on can include examining each of the candidate answers within the selected electronic documents (e.g., content resources blocks) and selecting the candidate answers that contain the key term from the question and/or the associated trunk words. Next, the computer system can determine completeness scores and relevance scores for each of the selected candidate answers (e.g., resource block). Those candidate answers (e.g., resource blocks) which score highly for both completeness and relevance can be assessed by ranking them in terms of timeliness and then assessing the semantic elements of each. Within those candidate answers (resource blocks) which score highly for both conciseness and relevance, the set of semantic elements in each candidate answer (e.g., resource block) is compared over time to see if the set of semantic elements changes with respect to time. If there is a consistent shift in the semantic elements over time (e.g., from tn to t(n+1)), then only those candidate answers (e.g., resource blocks) which were created or modified after time tn will be considered as possible answers; these will then be ranked by conciseness and presented to the user. If there is no consistent shift in the semantic elements over time, then the candidate answers (e.g., resource blocks) from all times will be ranked by conciseness and presented to the user.

In some implementations, candidate answers (e.g., resource blocks) that score highly for both completeness and relevance can be ranked by first conciseness and then timeliness. In some implementations, candidate answers (e.g., resource blocks) that score highly for both completeness and relevance can be ranked by first timeliness and then conciseness. In some implementations, candidate answers (e.g., resource blocks) that score highly for both completeness and relevance can be presented with two types of potential answers; those which are timelier and those which are more concise.

Figure 6:
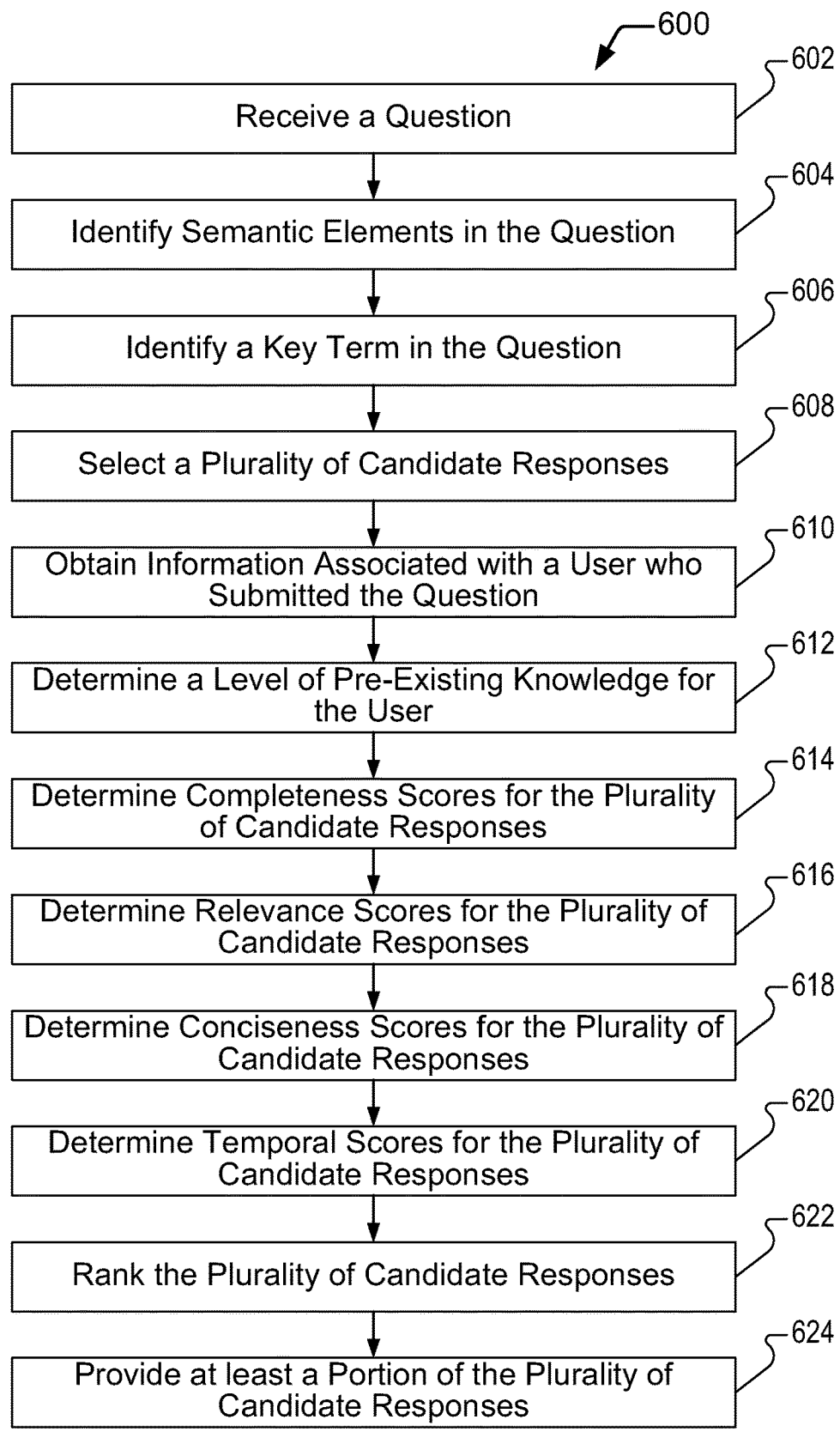
FIG. 6 is a flowchart that depicts an example method for providing an answer to a question.

FIG. 6 is a flowchart that depicts an example method 600 for providing an answer to a question. The method 600 may be performed by any of a variety of appropriate computer systems, such as the computer system 104 described above with regard to FIG. 1 and/or the computer system 200 described above with regard to FIG. 2.

The method 600 includes receiving a question (e.g., natural language question, keywords, search query) (602) and, in response, identifying one or more semantic elements in the question (604). A key term can also be identified in the question (606) and can be used to select a plurality of candidate responses to the question (608). Information associated with a user (e.g., user identifier, user role/profession) who submitted the question can be obtained (610) and can be used to determine a level of pre-existing knowledge for the user with regard to a topic of the question (612). Completeness scores can be determined for the plurality of candidate responses (614). Relevance scores can be determined for the plurality of candidate responses (616). Conciseness scores can be determined for the plurality of candidate responses (618). Temporal scores can be determined for the plurality of candidate responses (620).

The plurality of candidate responses can be ranked based on the determined level of pre-existing knowledge for the user, the completeness scores, the relevance scores, the conciseness scores, the temporal scores, or any combination thereof (622). In some implementations, a portion of the plurality of candidate responses that have high completeness scores (e.g., at least a threshold level completeness score) and/or high relevance scores (e.g., at least a threshold level relevance score) can be ranked based on conciseness scores and/or temporal scores. A user's role and/or pre-existing knowledge may also be a factor when ranking candidate responses. Based on the ranking, a least a portion of the plurality of candidate responses can be provided (624).

Figure 7:
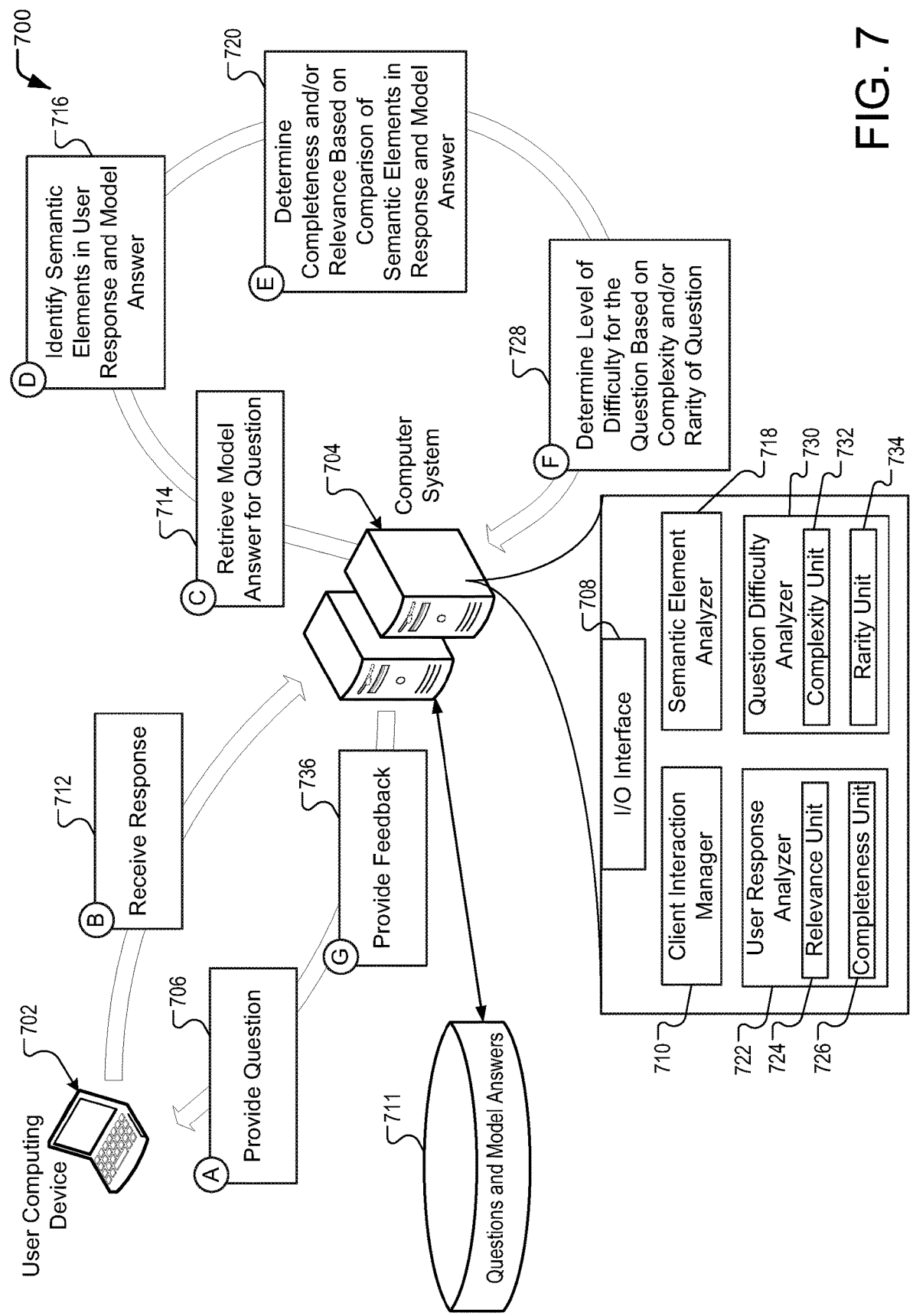
FIG. 7 is a conceptual diagram depicting an example computer system to analyze user answers to questions.

FIG. 7 is a conceptual diagram depicting an example computer system 700 to analyze user answers to questions. The computer system 700 includes a computer system 704 that provides questions to a user computing device 702 and that, in response to receiving a response from the user computing device 702, analyzes the user's response and provides feedback to the user. The computer system 704 can assist a user in identifying gaps in his/her knowledge on various topics, such as topics relating to the medical field.

The user computing device 702 can be any of a variety of appropriate computing devices and can be similar to the user computing device 102. The computer system 704 can be any of a variety of appropriate computer system and can be similar to the computer system 104.

As indicated by step A (706), the computer system 704 can provide one or more questions to the user computing device 702 over one or more networks. The computer system 704 can provide the one or more questions using an I/O interface 708 of the computer system 704, a client interaction manager 710, and a question and model answer database 711. The client interaction manager 710 can manage the selection of questions to be provided to the user computing device 702 and can also track questions that have been provided to and answers that have been received from various user computing devices. The question and model answer database 711 can include a collection processed questions for which there is a "best answer" based upon current knowledge, together with accepted standard answers for the questions. In some implementations, the question and model answer database 711 can include metadata associated with a question and/or its associated answer, such as semantic elements of the question (e.g., terms within the question and/or the meaning of words in the question), semantic elements of the model answer (e.g., terms in the model answer and/or the meaning of words in the model answer), and/or modifier words within the question and/or model answer, such as "not" and "always."

In response to receiving the question, the user computing device 702 can present the question (e.g., visually display, audibly output) to a user of the device and can receive an answer from the user (e.g., textual answer, voice input). In some implementations, the user's answer can include separated portions of the answer, such as objective portions that are separated by a colon from subjective portions of the answer (similar to a clinical note). In some implementations, the user can provide a hierarchy of issues with an implied order with or without a subjective summary (similar to a clinical note). In response to receiving a response to the question from the user, the client computing device 702 can provide the response to the computer system 704, as indicated by step B (712).

In response to receiving the user response, the computer system 704 retrieves a model answer that is associated with the question, as indicated by step C (714). The client interaction manager 710 can identify the question that the response from the user computing device 702 pertains to and can retrieve the corresponding model answer from the question and model answer database 711.

As indicated by step D (716), the computer system 704 can identify semantic elements in the user response and/or the model answer. The semantic elements can be identified by a semantic element analyzer 718, which can identify semantic elements similar to the semantic element analyzer 118 described above with regard to FIG. 1.

As indicated by step E (720), the computer system 704 can determine completeness and/or relevance scores for the user's response by comparing the semantic elements of the user's response and the model answer. Such completeness and/or relevance scores can indicate how directly and/or completely the user has answered the question, and can pinpoint possible gaps in the user's knowledge regarding the subject matter of the question. A user response analyzer 722 of the computer system 704 can analyze the user's response with regard to the model answer. The user response analyzer 722 can include a relevance unit 724 and a completeness unit 726, which can be similar to the relevance unit 124 and completeness unit 126 discussed above with regard to FIG. 1.

The completeness unit 126 can determine a completeness score for the user's response in any of a variety of ways. In a first example, the completeness score for the user's response as an answer to the question is determined based on (the semantic elements that are common between user's response and the (model answer and/or question and/or synonyms)) compared to (all the semantic elements in the (model answer and/or question and/or synonyms)).

In a second example, the completeness score for the user's response as an answer to the question is determined based on (the semantic elements that are common between user's response and the (model answer and/or synonyms)) compared to (all the semantic elements in the model answer).

In a third example, the completeness score for the user's response as an answer to the question is determined based on (the semantic elements that are common between user's response and the question) compared to (all the semantic elements in the question).

In a fourth example, the completeness score for the user's response as an answer to the question is determined based on (the semantic elements that are common between user's response and the (question and/or synonyms)) compared to (all the semantic elements in the (question and/or synonyms)).

In a fifth example, the completeness score for the user's response as an answer to the question is determined based on (the semantic elements that are common between user's response and the (question and/or synonyms)) compared to (all the semantic elements in the question).

In a sixth example, the completeness score for the user's response as an answer to the question is determined based on (the semantic elements that are common between user's response and the model answer) compared to (all the semantic elements in the model answer).

In a seventh example, the completeness score for the user's response as an answer to the question is determined based on (the semantic elements that are common between user's response and the (model answer and/or synonyms)) compared to (all the semantic elements in the (model answer and/or synonyms)).

In an eighth example, the completeness score for the user's response as an answer to the question is determined based on (the semantic elements that are common between user's response and the (model answer and/or synonyms)) compared to (all the semantic elements in the (model answer and/or question and/or synonyms)).

In a ninth example, the completeness score for the user's response as an answer to the question is determined based on (the semantic elements that are common between user's response and the (model answer, question, and synonyms)) compared to (all the semantic elements in the (model answer and question)).

In a tenth example, the completeness score for the user's response as an answer to the question is determined based on (the semantic elements that are common between user's response and the (model answer and/or question)) compared to (all the semantic elements in the (model answer and/or question)).

Completeness scores can vary along a range. For instance, with an example range from 0 to 1, a 0 completeness score can correspond to a response which missed all the elements in the model answer and a 1 completeness score can correspond to a response that is a fully complete response in that it contains all of the elements in the model answer.

The relevance unit 724 can determine a relevance score for the user's response. The determined relevance score can indicate the degree to which the user's response remains focused upon the semantic elements contained in the model answer and may be represented as a ratio of relevant content in the user's response to irrelevant content in the user's response. A ratio skewed in favor of relevant information (more relevant information than irrelevant information) can indicate that the user's response is more focused on the correct (model) answer than it is not. In contrast, a ratio that indicates there is more irrelevant information than relevant information in the user's response can suggest that the user's response is more focused on incorrect/irrelevant details than it is focused on details contained in the model answer.

The relevance score can be determined in a variety of ways. In a first example, the relevance score for the user's response to the question can be determined based on (all the elements contained in both the user's response and the model answer) compared to (all the elements contained in both the user's response and the model answer) and (all the other elements in the user's response) compared to (all the elements in the model answer)=1+(all the elements in the user's response that are not in the model answer)/(all the elements in the model answer).

In a second example, the relevance score for the user's response to the question can be determined based on (all the elements contained in both the user's response and the (model answer and/or synonyms)) compared to (all the elements contained in both the user's response and the (model answer and/or synonyms)) and (all the other elements in the user's response) compared to (all the elements in the (model answer and/or synonyms)).

In a third example, the relevance score for the user's response to the question can be determined based on (all the elements contained in both the user's response and the (model answer+synonyms))/(all the elements contained in both the user's response and the (model answer+synonyms))+(all the other elements in the user's response)/(all the elements in the model answer).

In a fourth example, the relevance score for the user's response to the question can be determined based on (all the elements contained in the user's response)/(all the elements in the model answer).

In a fifth example, the relevance score for the user's response to the question can be determined based on (all the elements contained in the user's response)/(all the elements in the (model answer+synonyms)).

In a sixth example, the relevance score for the user's response to the question can be determined based on (all the elements contained in the user's response)/(all the elements in the question).

In a seventh example, the relevance score for the user's response to the question can be determined based on (all the elements contained in the user's response)/(all the elements in the (question+synonyms)).

In an eighth example, the relevance score for the user's response to the question can be determined based on (all the elements contained in the user's response)/(all the elements in the (model answer, question, +synonyms)).

In a ninth example, the relevance score for the user's response to the question can be determined based on (all the elements contained in the user's response)/(all the elements in the (model answer and/or question)).

One or more of the examples above may express manners of determining an irrelevance score of the user's response. Relevance scores can be the inverse of irrelevance scores, where a relevance score=1/irrelevance score. Relevance scores can be determined along any of a variety of ranges, such as 0 to 1. With such an example range, a perfectly relevant response will have a relevance score=1 because the elements of the respondent's answer will exactly match the elements of the target answer. Higher irrelevance scores (or lower relevance scores) show the degree to which the response contains extraneous ideas. For instance, an irrelevance score of 2 (relevance score=0.5) shows that there are twice as many elements in the respondent's answer as in the target answer.

As indicated by step F (728), the computer system 704 can determine a level of difficulty for the question based on the complexity of the question and/or the rarity of the question. A question difficulty analyzer 730 of the computer system 704 can make such a determination using a complexity unit 732 to determine the complexity of the question and a rarity unit 734 to determine the rarity of the question.

Complexity is a measure of how much of a step up or down there was between the question and the model answer. For instance, a specific question for which all of the elements of the question also occur in the target answer suggests that there was no outside the box thinking needed to answer the question. On the other hand, an answer with multiple new ideas in it (relative to the question) is a much bigger step up or down and therefore a more challenging question.

The complexity unit 732 can determine a complexity score for the question in a variety of ways. For example, the complexity of the question can be determined based on (the elements contained in the model answer which were not contained in the original question) compared to (all the elements in the model answer)). In another example, the complexity of the question can be determined based on (the elements contained in the model answer which were not contained in the original (question and/or synonyms)) compared to (all the elements in the model answer)). Complexity scores can vary along any of a variety of ranges, such as 0 to 1. With such an example range, 0 can correspond to the model answer including no new ideas beyond those in the question. A score of 1 means that there were no elements in common between the question and the model answer, so all the elements of the model answer are new.

Rarity scores for questions can indicate how frequently the question is asked. The rarity unit 734 can determine a rarity score for the question in a variety of ways. In a first example, the rarity score for the question can be determined based on a percentage of previously asked questions, such as question asked by user as discussed above with regard to FIG. 1-6, that included the semantic elements of the question. In a second example, the rarity score for the question can be determined based on a predefinition by an expert group of users. In a third example, the rarity score for the question can be determined based on the frequency with which semantic elements from the question appear in one or more trusted resource blocks, such as chapters from a medical textbook.

The question difficulty analyzer 730 can determine the difficulty of a question in a variety of ways. For example, the difficulty of a question can be determined based on a product of the complexity score and the rarity score for the question.

As indicated by step G (736), feedback regarding the user's response can be provided to the user computing device 702 by the computer system 704. The feedback can include information that indicates how completely the user's response answered the question, how relevant the user's response was to the question/model answer, and/or how difficult the question was. Examples of feedback that are provided to the user are depicted in and discussed with regard to FIG. 9 below. In some implementations, the feedback can include the model answer and information that specifically identifies semantic elements from the model answer that were not addressed by the user's response.

Figure 8:
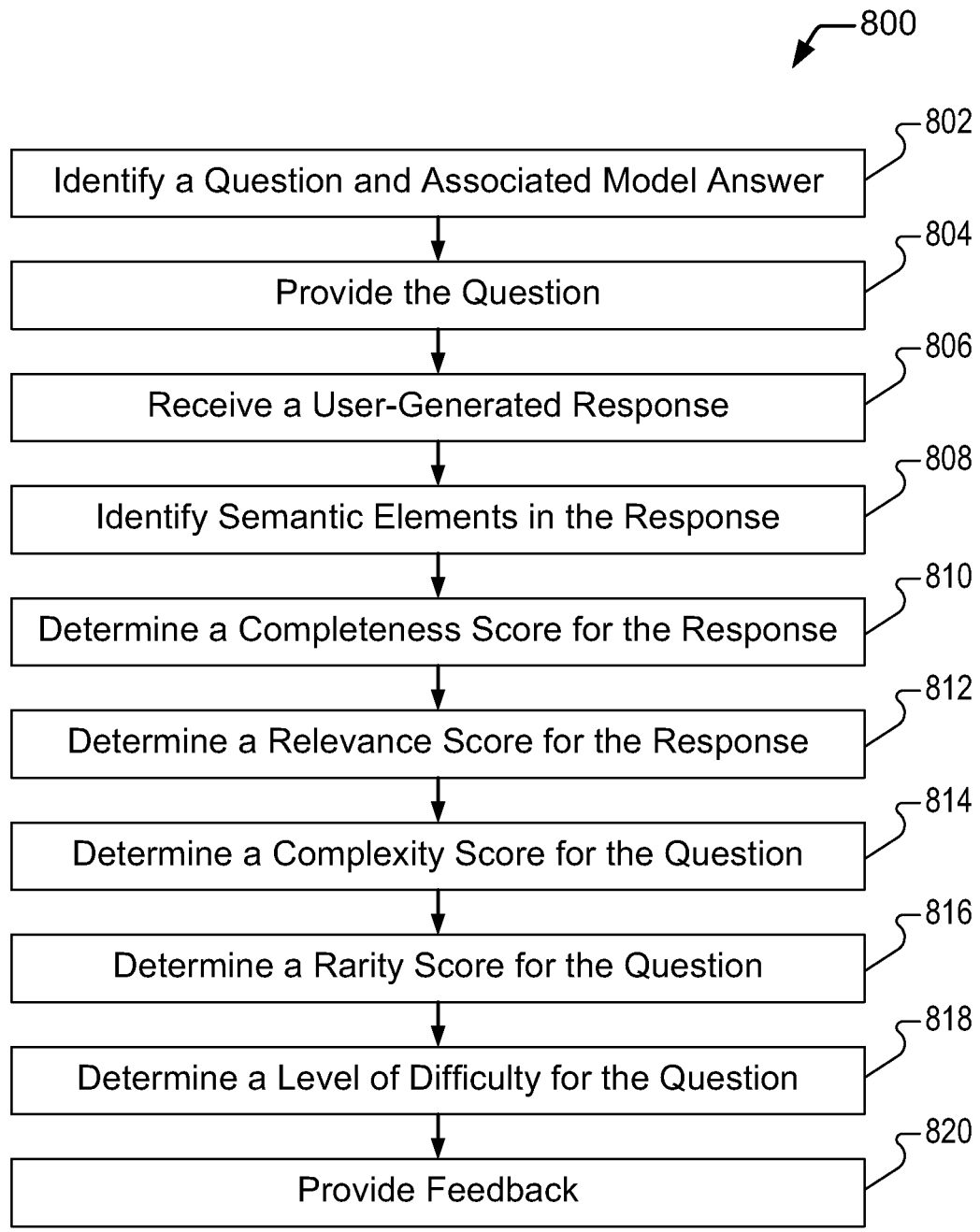
FIG. 8 is a flowchart depicting an example method for analyzing a user's response to a question and providing feedback to the user.

FIG. 8 is a flowchart depicting an example method 800 for analyzing a user's response to a question and providing feedback to the user. The example method 800 can be performed by any of a variety of computer systems, such as the computer system 704 described above with regard to FIG. 7.

A question and associated model answer can be identified (802) and the question can be provided to a client computing device (804). A user-generated response to the question can be received (806) and can be analyzed to identify semantic elements (808). Using the identified semantic elements in the user-generated response and semantic elements from the question and/or model answer, a completeness score for the response can be determined (810) and a relevance score for the response can be determined (812). Additionally and/or alternatively, a complexity score for the question can be determined (814) and a rarity score for the question can be determined (816), from which a level of difficulty for the question can be determined (818). Feedback can be provided to the client computing device based on the determined completeness score, relevance score, and/or difficulty level of the question (820).

Figure 9:
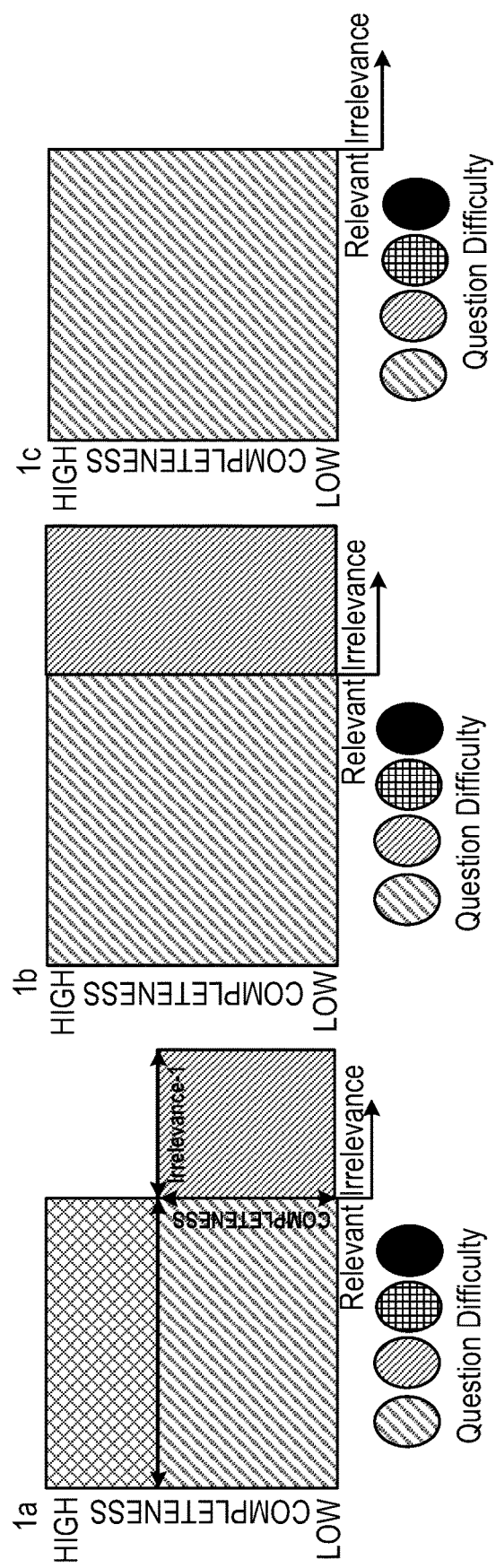
FIG. 9 depicts three example charts that provide feedback regarding a user's response to a question.
Figure 10:
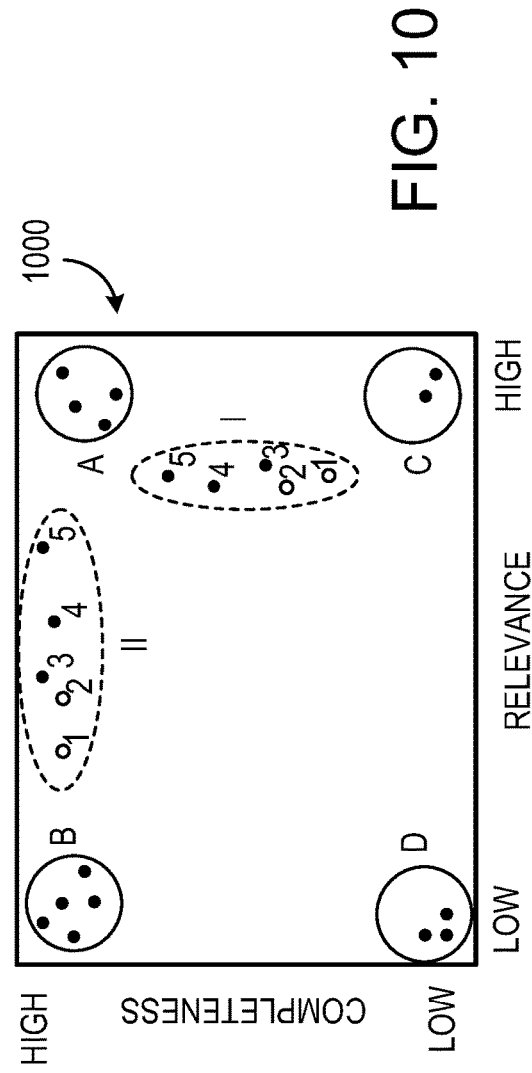
FIG. 10 is a graph that depicts a distribution of example user answers to a question based on completeness and relevance.

FIG. 9 depicts three example charts 1a-c that provide feedback regarding a user's response to a question. The example charts 1a-c can be provided by the computer system 704 to the user computing device 702 in response to receiving a user answer to a question posed by the computer system 704.

The example charts 1a-c simultaneously display completeness and relevance, which together can assess the strength of a user's answer. The example charts 1a-c also include a scale to indicate which level of question difficulty applies to the question at issue. In example chart 1a, the answer is both incomplete and contains irrelevant content (this example also includes a scale that indicates the degree of completeness and relevance of the user's answer). In example chart 1b, the answer is complete but contains irrelevant content. In example chart 1c, the answer is perfect for both completeness and relevance.

A variety of additional information can be provided as feedback. For example, numerical scores can be provided for completeness and/or relevance/irrelevance. In another example, separate bar charts for completeness and/or relevance can be provided. In a further example, relevance/irrelevance can be provided on the y-axis of the charts 1a-c and completeness can be provided on the x-axis of the charts 1a-c.

In addition to the overall summary for the user, feedback can include the question together with the user's answer, and color (or other information to identify) semantic elements in the respondent's answer according to whether they were 1) an element in completeness (e.g., the semantic element from the user's answer was included in the model answer or synonym) and 2) an element of relevance/irrelevance (e.g., the semantic element from the user's answer was not included in either the target answer or synonym or the question or synonym).

Figure 11:
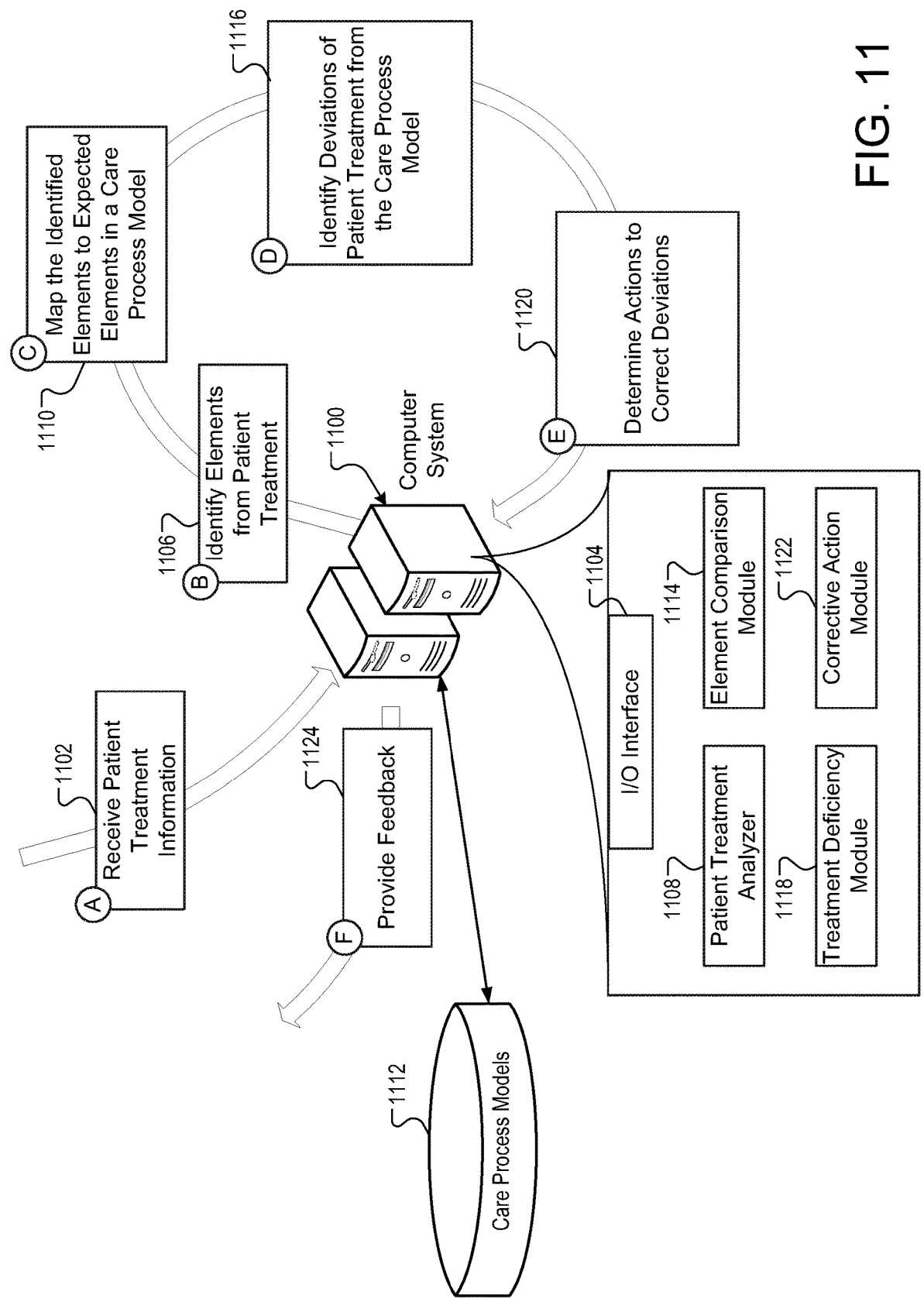
FIG. 11 is a conceptual diagram of an example process aware computer system that can identify patient care that has deviated from one or more care process models and that can suggest corrective actions to remedy such deviations.

FIG. 11 is a conceptual diagram of an example process aware computer system 1100 that can identify patient care that has deviated from one or more care process models and that can suggest corrective actions to remedy such deviations.

The process aware computer system 1100 can be can be any of a variety of appropriate computer systems, such as a laptop computer, a desktop computer, and/or one or more computer servers (e.g., a cloud computing server system). The process aware computer system 1100 can communicate over one or more networks (not depicted), such as the Internet, a local area network (LAN), a wide area network (WAN), a wifi network, a cellular network, a wireless data network (e.g., 3G/4G network), or any combination thereof.

As indicated by step A (1102), the computer system 1100 can receive patient treatment information through an input/output (I/O) interface 1104 of the computer system 1100. The patient treatment information can be any of a variety of information that includes an observation or record related to the treatment of a patient in a medical setting, such as progress notes, discharge summaries, outpatient care logs, emergency department notes, clinical notes, and/or other treatment information. The patient treatment information can be received from any of a variety of appropriate sources, such as another computing device (e.g., a medical record computer system, a doctor's computing device) and/or from a user (e.g., patient information manually provided to the computer system 1100 through one or more user input devices). The I/O interface 1104 can be any of a variety of appropriate interfaces through which the computer system 1100 can communicate with users and/or other computing devices, such as a mouse, a keyboard, an Ethernet card, and/or a wireless transceiver.

As indicated by step B (1106), the computer system 1100 can identify one or more element that are included in the patient treatment information. Elements can include any of a variety of details regarding treatment of a patient, such as actions that have been performed, diagnoses that have been made, diseases that have been identified, qualitative terms that have been used in the patient treatment information, temporal indicators, diagnostic findings, relevant portions of a patient's medical history, and/or other relevant factors. Such elements may be identified using any of a variety of appropriate techniques, such as using one or more of the semantic analysis techniques described above. The elements may be identified by a patient treatment analyzer 1108 that is part of the computer system 110. The identified elements may be represented in any of a variety of appropriate data structures, such as an array of elements.

As indicated by step C (1110), the computer system can map the identified elements to expected elements that are identified in one or more relevant care process models (CPMs), which can each define an algorithm for diagnosing, treating, and/or managing one or more clinical problems (e.g., medical conditions, diseases). Elements from the patient treatment information can be compared to similar expected elements from the CPM to determine whether, given the available information to the health care provider at various stages during the treatment process, the health care provider performed subsequent actions that were consistent with the CPM. The CPMs can be retrieved by the computer system 1100 from a CPM repository 1112 and can outline current accepted/preferred treatment procedures within one or more relevant medical community. An appropriate CPM may be identified for the specific treatment information based on one or more primary indicators of treatment, such as a disease that is identified within the patient treatment information. The comparison of the elements of the patient treatment information and the expected elements in the CPM can be performed by an element comparison module 1114 of the computer system 1100.

As indicated by step D (1116), the computer system 1100 can identify where, if at all, the patient treatment outlined in the patient treatment information deviated from the model treatment regimen outlined in the CPM. For example, the computer system 1100 can determine whether a deviation occurred with regard to one or more categories, including disease identification, actions performed by the health care provider, treatments prescribed, diagnostic tests, the timing and order in with which various stages of the process occurred, and/or other categories. Deviations may be weighted based on a hierarchical ordering of such categories. In one example hierarchy, disease may weighted most heavily, followed by actions, quality of treatment indicators, and timing information. A report may be generated based on the deviations identified in step D, where the weighting can be used to select an order and emphasis applied to each of the deviations. The deviations can be identified by a treatment deficiency module 118 of the computer system 1100.

As indicated by step E (1120), the computer system 1100 can determine one or more corrective actions that can be suggested to the health care provider to correct the identified deviations. Corrective action can include teaching materials that focus on the specific deficiencies identified in step D so as to assist the health care provider in understanding his/her error and how to correct that error in similar scenarios. The corrective actions may also include corrective treatment actions that can be performed with regard to the patient to whom the patient treatment information pertains. For example, the computer system 1100 may receive the patient treatment information in step A (1102) as it is logged by a health care provider and the steps B-E may be performed shortly after the patient treatment information is received. Accordingly, the health care provider may receive an instant notification of the deficiencies in his/her treatment for the patient as well as one or more corrective actions that can be presently performed to minimize any harm that may be caused to the patient as a result of the deviation. The determination in step E (1120) can be performed by a corrective action module 1122 of the computer system 1100.

As indicated by step F (1124), the computer system 1100 can provide feedback regarding the patient treatment information. For example, the computer system 1100 can provide a report that identifies the deficiencies in the treatment provided to the patient described in the patient treatment information and that includes information (e.g., educational information) to assist the health care provider in avoiding such deviations in the future.

In addition to providing remedial information to health care providers, the computer system 1100 may aggregate the feedback information regarding the detected deviations in order to identify macro issues across a broader spectrum of health care providers. For example, such aggregated information may be used to identify systemic/habitual problems with specific health care systems, facilities, and/or providers. In another example, such aggregated information may be used to identify possible deficiencies in the CPMs. For instance, if the same deviation from the CPMs appears frequently across a diverse group of health care providers, the deviation may indicate an error in the CPM and not in the treatment provided by the health care provider. In a further example, the deviation may be used to identify deficiencies in the documentation included in the patient treatment information (e.g., health care provider did not provide sufficient details to adequately describe the treatment provided to the patient). Such deficiencies may negatively affect a variety of aspects of related to patient treatment, such as increasing the likelihood that the treatment will not be reimbursed by a health insurer and/or leaving a patient with a deficient documented medical history.

Figure 12:
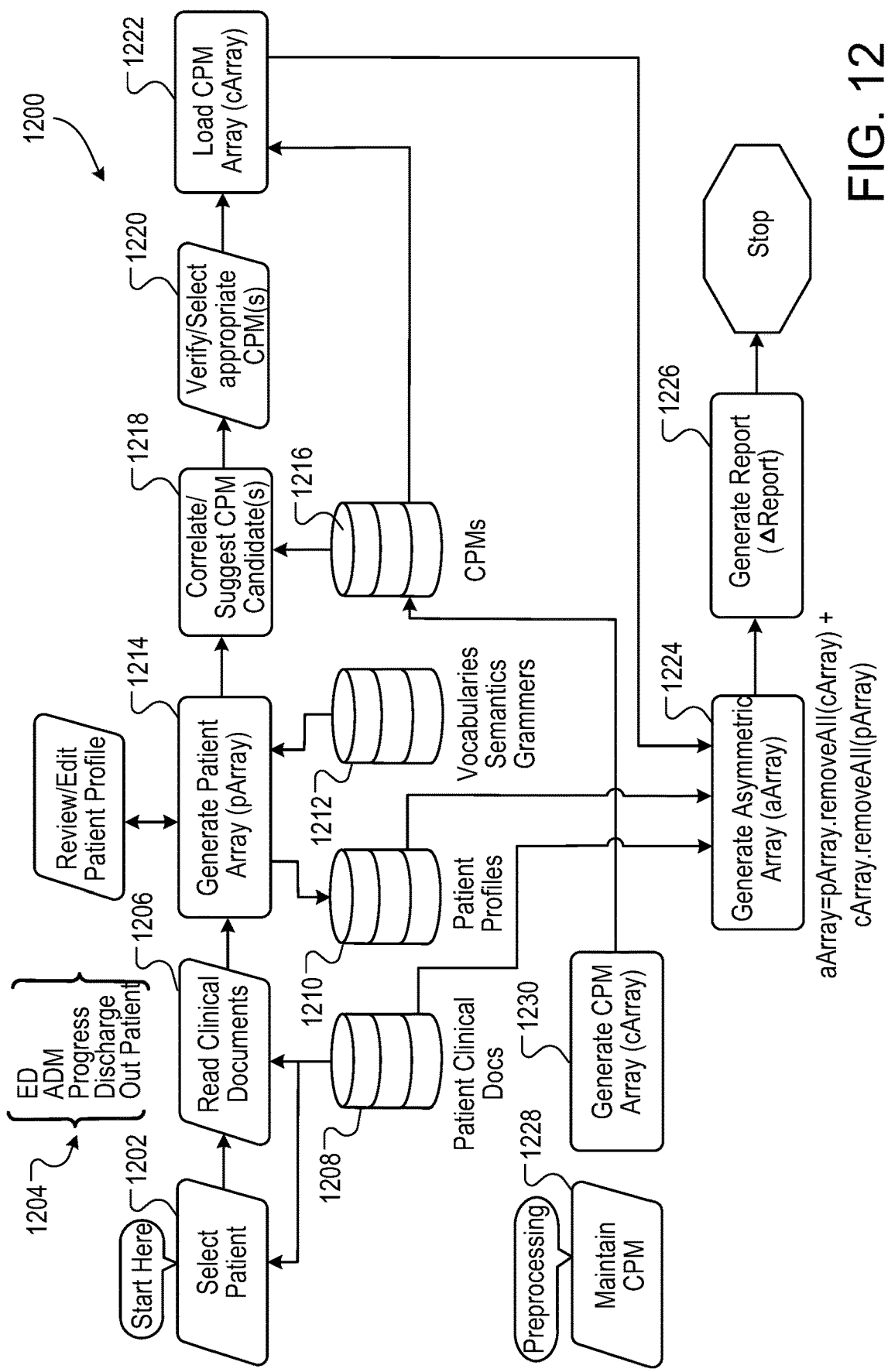
FIG. 12 depicts a flowchart for an example technique for identifying compliance with a care process model.

FIG. 12 depicts a flowchart for an example technique 1200 for identifying compliance with a care process model (CPM). The example technique 1200 can be performed by any of a variety of appropriate computing devices, such as the computer system 1100 described above with regard to FIG. 11.

A patient can be selected (1202) and clinical documents 1204 for the patient can be read (1204). The clinical document 1204 can include any of a variety of appropriate clinical documents, such as emergency department (ED) documents, advanced diabetes management (ADM) documentation, process notes, discharge papers, and/or outpatient care summaries. The clinical documents 1204 that are relevant to the patient can be identified from a clinical documents repository 1208.

Using a patient profile from a repository of patient profiles 1210 and information to parse the clinical documents into their semantic elements, such as vocabularies, semantic information, and grammatical information contained in the repository 1212, elements from the clinical document can be identified and arranged into a patient array (1214).

In some implementations, step 1202 can involve selecting one or more pseudo-patients which are test patients with characteristics similar to an actual patient but with the patient identifiers removed. Clinical documents for the pseudo-patients can be retrieved (1204) and can be used, in combination with a patient profile (1210) and the semantic information (1212), to generate a patient array for the patient (1214).

Based on elements contained in the patient array, one or more candidate CPMs can be identified from a repository 1216 of CPMs (1218). One or more of the candidate CPMs can be verified for comparison against the patient array (1220) and a CPM array that includes expected elements for the CPM can be loaded (1222).

The patient array and the CPM array can be compared to each other to identify areas where the patient array deviated, if at all, from the CPM array, the result of which can be an asymmetric array (1224). For example, the deficiencies can be identified with regard to various aspects of patient care that are detailed in the clinical documents, such as diagnosed diseases, actions performed by the clinician, timing and/or order for various actions, diagnostic testing that was ordered, and/or other aspects of patient care. Using the asymmetric array, a report can be generated detailing the deficiencies and/or providing corrective suggestions (1226).

The example technique 1200 also includes a preprocessing portion during which CPMs are maintained (1228) and corresponding CPM arrays are generated and stored in the repository 1216 of CPMs (1230).

Figure 13A:
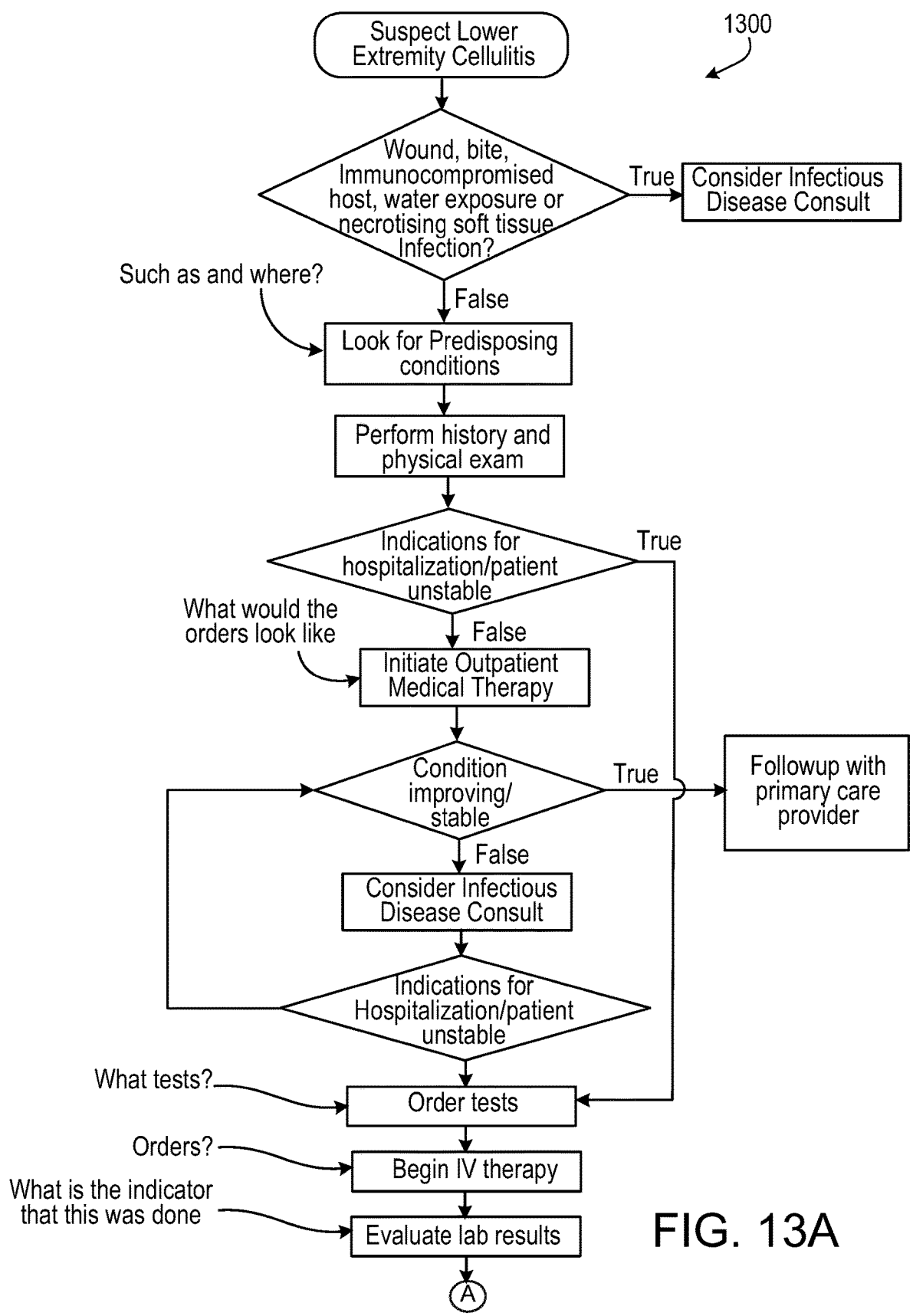
FIGS. 13A-B depict an example care process model for diagnosing and treating an example medical condition.
Figure 13B:
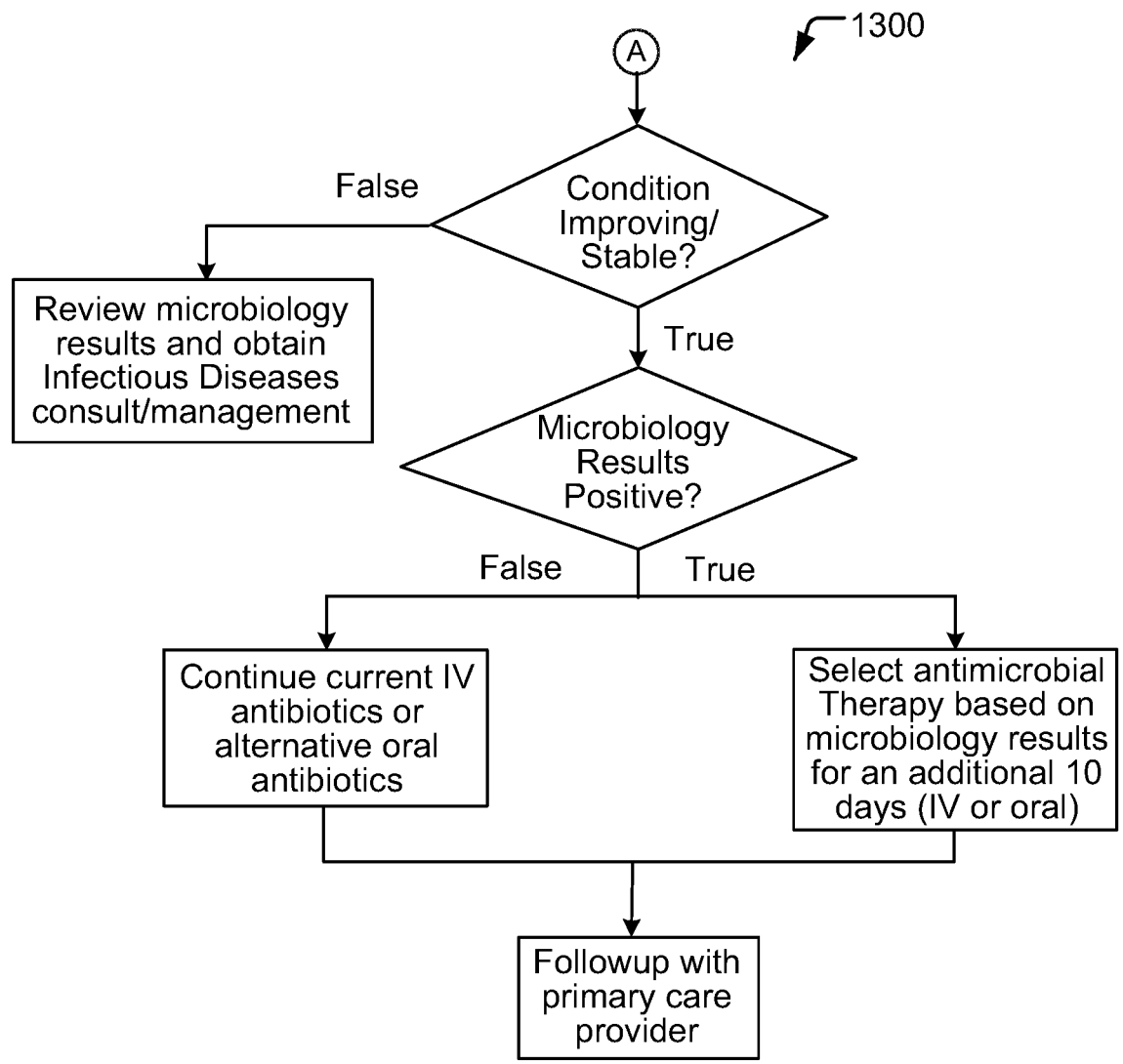

FIGS. 13A-B depict an example care process model (CPM) 1300 for diagnosing and treating an example medical condition (cellulitis). The CPM 1300 outlines a process of actions and decision points that can be followed to diagnose a patient suspected of having cellulitis. The CPM 1300 can be semantically analyzed to identify the expected elements for treating cellulitis, which can be compared to the elements of a patient treatment to determine whether the patient treatment deviated, if at all, from the procedure outlined in the CPM 1300.

In some embodiments, semantic analysis in medicine (SAM) is used. SAM is a Clinical Decision Support System (CDSS) developed to answer clinician questions at the point of care. SAM identifies candidate answers in documents using the complete, concise, relevant, timely (CCRT) question answering algorithm that directs the user to specific sections and paragraphs within its document library. Currently, providers order procedures, tests, and evaluations by asking questions that are routinely reviewed or interpreted for cogency. SAM interprets these questions for coherence and helps providers locate the recommended resource for the physician's clinical question. Standardizing the process of ordering procedures, tests and evaluations empowers health care delivery organizations to better manage health care quality and cost.

Figure 14:
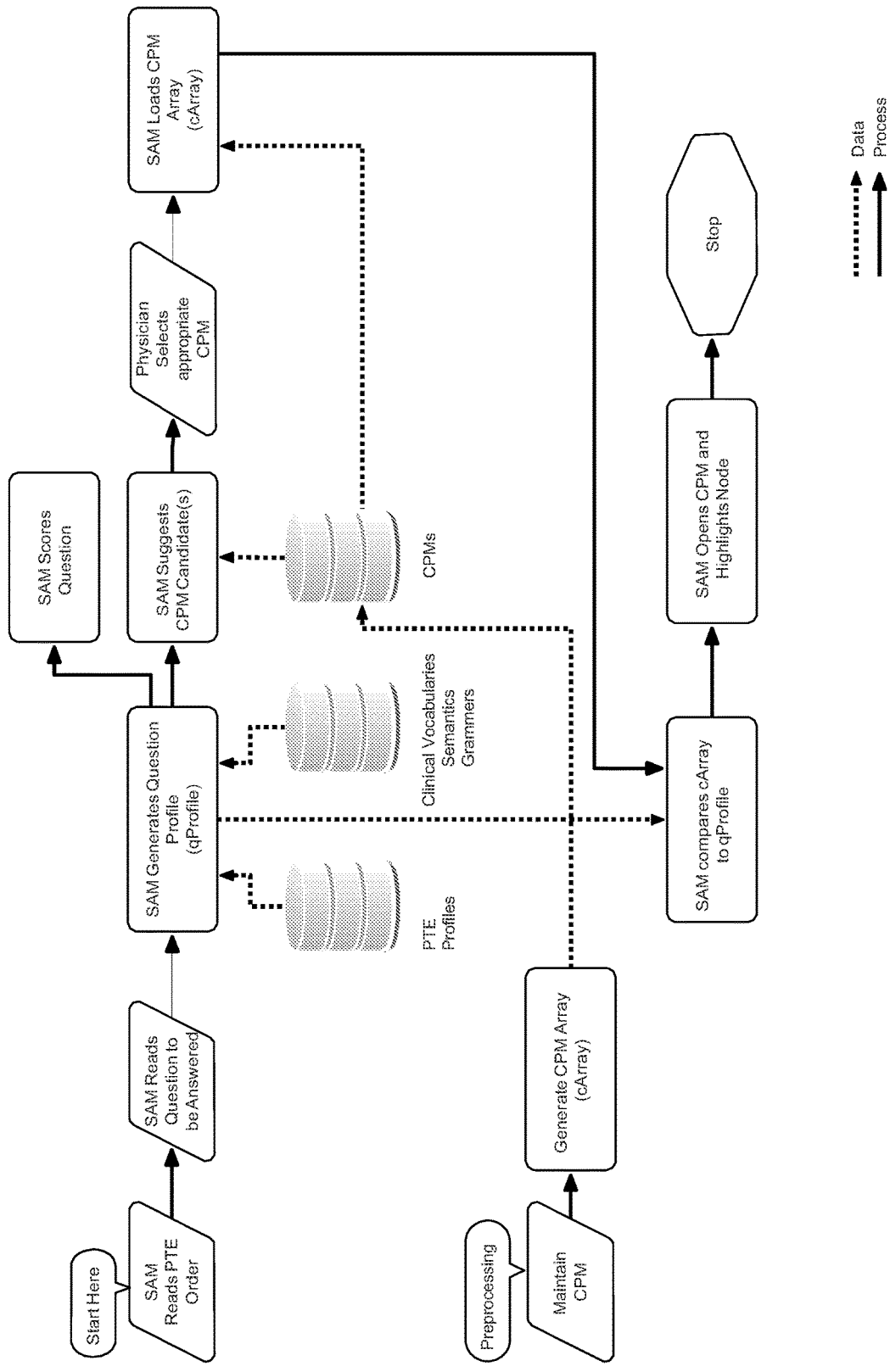
FIG. 14 depicts a flowchart for an example procedure test evaluation model.

SAM analyzes the questions being asked and scores them in order to provide feedback with respect to how likely the question can be interpreted correctly and an appropriate answer found. SAM was tested by using actual clinical questions from field labeled "what is the question to be answered" field within an electronic medical records (EMR) when providers were requesting procedures, tests, and evaluations (e.g., procedure test evaluation). An example procedure test evaluation (PTE) functional flow diagram is shown in FIG. 14. SAM can search flow charts contained within clinical guidelines. SAM locates the appropriate answer first by identifying the appropriate CPM and then locating within the CPM the content reflecting the best answer corresponding to the physician's question, as shown in FIG. 14. Described in further detail below is a method to extract the question and procedure requested from an EMR and display it on a physician's personal device (e.g., smart phone, tablet, or computer) and allow SAM to provide for additional information to be sent back to the EMR order entry requests for PTEs.

The purpose of SAM is to help clinicians find evidence-based answers to clinical questions at the point of care. SAM has three functions: SAM Question and Answer (QA), SAM Process Aware (PA), and SAM Teaching Assistant (TA). SAM uses semantic elements in a question and statistical metrics to find answers within evidence-based content such as clinical guidelines. This methodology does not exclude key word search and does not depend on tagging documents in order to improve search results. A leading technical advantage of SAM is reduced preprocessing time required of the evidence-based content. From a physician's perspective, the better the question asked, the more specific and targeted the answer.

SAM is able to discriminate between well-formed and poorly-formed questions in a manner similar to human reviewers. SAM is able to find answers to clinical questions using content from structured sources including flow charts found in clinical guidelines. The three functions of SAM serve to provide health care organizations with a new kind of tool to monitor and manage the drivers of health care quality and costs.

As discussed above, SAM has three functions: SAM QA, SAM PA, and SAM TA. For SAM QA, physicians ask clinical questions using, for example, a mobile device or a computer. SAM QA identifies the top potential responses from vetted resources (e.g., clinical guidelines or other approved resources). Rather than identifying a complete document, SAM identifies the component of the document that is most likely to contain the answer. For SAM PA, rather than relying on physicians to proactively ask clinical questions, SAM PA is associated with an electronic medical record. Whenever a PTE is ordered, SAM identifies top vetted resources that may be used to justify that PTE. In a first step, the clinical question is evaluated to determine whether it is well-formed. Poorly formed questions cannot be used to identify resources. In a second step, SAM evaluates top potential resources to justify the order. In a third step, the physician selects the most appropriate resource. This process also helps ensure that the correct PTE is being ordered. In a fourth step, the SAM resource is linked to the PTE as proactive justification in case of audit. For SAM TA, users answer a clinical question that has a known, defined answer. Users' answers are scored against a gold standard to help them identify whether their answers lack completeness or contain irrelevant information. Clinical questions are rated by difficulty and topic.

SAM can provide feedback to a user about whether a questions is interpretable. In a test, four human reviewers assessed a sample of 280 questions to determine whether a question was interpretable. Data from SAM was used to build a model to automatically determine whether a question is interpretable. The test determined that interpretability of the question increased when the provider's order (e.g., electrocardiogram; echo, stress dobutamine; echo, TEE, adult transesophageal; heart failure clinic) was included with the question. For 75% of the questions reviewed, SAM found the same result as the panel of four reviewers. When SAM disagreed with the panel of four reviewers, 63% of the time the four reviewers also disagreed with one another.

SAM interacts with the EMR to provide feedback on interpretability. For instance, if SAM determines that the question is not interpretable, SAM can ask the provider to clarify the question. If SAM determines that the question is interpretable, SAM can provide a list of resources related to that question. Providers can review the list to find a resource that justifies the selected management strategy. If the provider selects a resource, a link for the selected resource can be saved with the order to defend the provider's order as an appropriate utilization of services. If no resource is found, the provider can use SAM to find appropriate management strategy and change the selected order.

Figure 15:
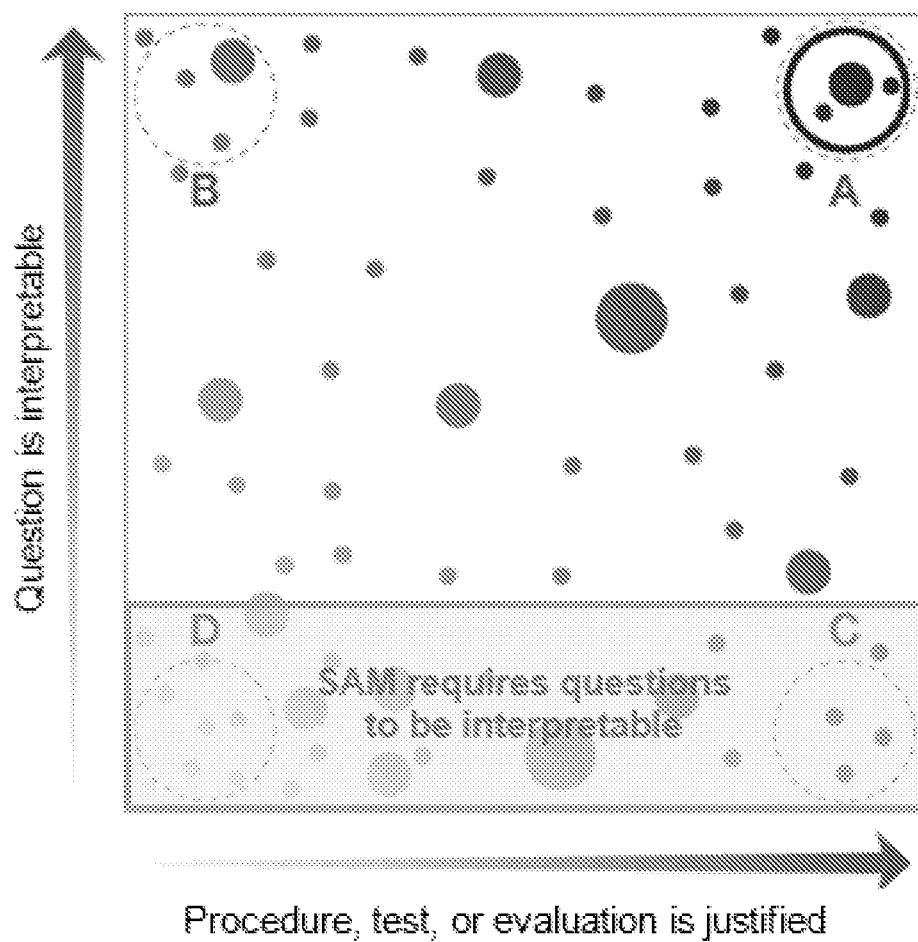
FIG. 15 is a graph that depicts an example distribution of questions according to whether each question is interpretable and whether corresponding procedure, test, or evaluation from a provider is justified.

In post hoc analyses, SAM can objectively assess the degree to which selected CPMs are associated with the particular clinical question and PTE. FIG. 15 shows a graph that depicts an example distribution of this post hoc analysis. The graph shows a distribution of questions according to whether each question is interpretable and whether corresponding PTE from a provider is justified. Region A includes questions that are interpretable where the corresponding PTE is objectively justifiable by the selected CPM. Region B includes questions that are interpretable, but the provider did not select a CPM that was objectively justifiable to link the clinical question and the PTE. In regions C and D, the questions are not interpretable. In region C, SAM informations situations where the question is not interpretable even though the PTE is appropriate. In region D, SAM informs situations where the question is not interpretable and the PTE is not appropriate.

SAM delivers clinical updates when new requests are made for procedures, tests, and evaluations, so linked orders and their resources use current guidelines. SAM can interpret very concise requests so that little modification is needed for concise but appropriate clinical questions.

SAM has several advantages over other computer applications used for answering clinical questions. The patient can expect that appropriate diagnosis and therapy used will more often, lead to better care. Physicians and other health care providers can be informed when best practices change because SAM provides feedback on changes during the workflow of requesting procedures, tests, and evaluations, resulting in a higher likelihood of following current recommendations. Overall, health care delivery organizations (hospitals, clinics, physician private practices) can use SAM's ability to link the order and appropriate defined recommendations, to create performance measures based on utilization data per order, disease category, individual providers, departments or divisions, hospitals, or campuses.

SAM is not intended to replace physician decisions with computer generated diagnosis. Instead, SAM supports providers in finding the appropriate diagnostic process. SAM does not replace physician's recommendations for therapy. Instead, SAM supports providers in confirming their requests for procedures, tests, or evaluations are evidence-based and the most appropriate therapeutic strategy. SAM can help to standardize the methods used to generate revenue.

Figure 16:
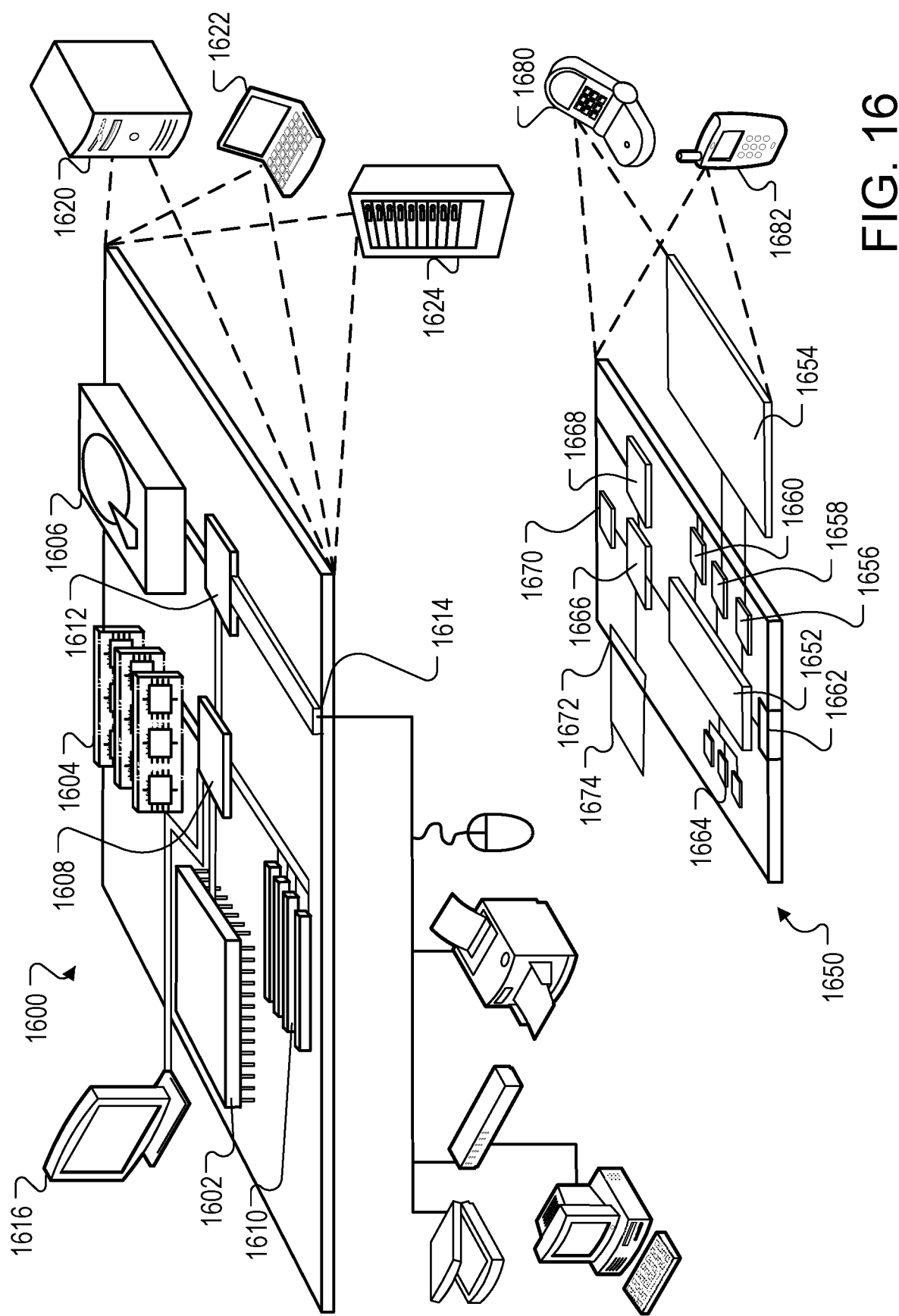
FIG. 16 is a block diagram of example computing devices.

FIG. 16 is a block diagram of computing devices 1600, 1650 that may be used to implement the systems and methods described in this document, as either a client or as a server or plurality of servers. Computing device 1600 is intended to represent various forms of digital computers, such as laptops, desktops, workstations, personal digital assistants, servers, blade servers, mainframes, and other appropriate computers. Computing device 1650 is intended to represent various forms of mobile devices, such as personal digital assistants, cellular telephones, smartphones, and other similar computing devices. Additionally computing device 1600 or 1650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. Additionally, the processor may be implemented using any of a number of architectures. For example, the processor 1652 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT (Thin-Film-Transistor Liquid Crystal Display) display or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provide in communication with processor 1652, so as to enable near area communication of device 1650 with other devices. External interface 1662 may provide, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provide as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652 that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, WiFi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smartphone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for analyzing and answering questions may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, at a computer system, a question from a user;
identifying, by the computer system, a topic of the question;
classifying, by the computer system, the user as belonging to a particular user category of a plurality of user categories;
accessing, by the computer system, a model for the particular user category of the user, the model identifying topics for which users in the particular user category are recognized as having specialized knowledge;
identifying, by the computer system, a candidate response to the question and a level of background information that the candidate response contains on the topic of the question;
evaluating, by the computer system, the model to determine a level of pre-existing knowledge of the user with respect to the topic of the question;
comparing, by the computer system, the level of background information on the topic of the question contained in the candidate response to the level of pre-existing knowledge of the user with respect to the topic;
determining a relevance score for the candidate response, wherein the relevance score indicates how relevant the candidate response is to the question;
determining, by the computer system and based at least on the relevance score for the candidate response and a result of comparing the level of background information on the topic of the question contained in the candidate response to the level of pre-existing knowledge of the user with respect to the topic, whether to return the candidate response for presentation to the user; and
returning the candidate response for presentation to the user.

2. The computer-implemented method of claim 1, wherein determining the candidate response to the question comprises selecting the candidate response from one or more electronic documents.

3. The computer-implemented method of claim 1, wherein determining the candidate response comprises comparing one or more first semantic elements in the question to pre-defined semantic elements.

4. The computer-implemented method of claim 1, wherein classifying the user as belonging to the particular user category of the plurality of user categories comprises classifying the user as having a particular organizational role or title of a plurality of pre-defined organizational roles or titles.

5. The computer-implemented method of claim 4, comprising determining whether to return the candidate response for presentation to the user based on whether the level of background information on the topic of the question contained in the candidate response corresponds to the level of pre-existing knowledge attributed to users having the particular organizational role or title to which the user was classified.

6. The computer-implemented method of claim 1, wherein the candidate response contains a reduced level of background information on the topic relative to other available candidate responses, and the computer system determines to return the candidate response for presentation to the user based on the user having at least a minimum level of pre-existing knowledge related to the topic of the question.

7. The computer-implemented method of claim 1, further comprising determining a completeness score for the candidate response, wherein the completeness score indicates how completely the candidate response answers the question, wherein the computer system determines whether to return the candidate response for presentation to the user further based on the completeness score for the candidate response.

8. The computer-implemented method of claim 1, wherein determining whether to return the candidate response for presentation to the user comprises determining a first set of semantic elements in the question from the user and comparing the first set of semantic elements to a second set of semantic elements that occur in the candidate response.

9. A system comprising:
one or more processors; and
one or more non-transitory computer-readable media having instructions stored thereon that, when executed by the one or more processors, cause performance of operations comprising:
receiving, at the system, a question from a user;
identifying, by the system, a topic of the question;
classifying, by the system, the user as belonging to a particular user category of a plurality of user categories;
accessing, by the system, a model for the particular user category of the user, the model identifying topics for which users in the particular user category are recognized as having specialized knowledge;
identifying, by the system, a candidate response to the question and a level of background information that the candidate response contains on the topic of the question;

evaluating, by the system, the model to determine a level of pre-existing knowledge of the user with respect to the topic of the question;

comparing, by the system, the level of background information on the topic of the question contained in the candidate response to the level of pre-existing knowledge of the user with respect to the topic;

determining a relevance score for the candidate response, wherein the relevance score indicates how relevant the candidate response is to the question;

determining, by the system and based at least on the relevance score for the candidate response and a result of comparing the level of background information on the topic of the question contained in the candidate response to the level of pre-existing knowledge of the user with respect to the topic, whether to return the candidate response for presentation to the user; and returning the candidate response for presentation to the user.

10. The system of claim 9, wherein determining the candidate response to the question comprises selecting the candidate response from one or more electronic documents.

11. The system of claim 9, wherein determining the candidate response comprises comparing one or more first semantic elements in the question to pre-defined semantic elements.

12. The system of claim 9, wherein classifying the user as belonging to the particular user category of the plurality of user categories comprises classifying the user as having a particular organizational role or title of a plurality of pre-defined organizational roles or titles.

13. The system of claim 9, wherein the candidate response contains a reduced level of background information on the topic relative to other available candidate responses, and the computer system determines to return the candidate response for presentation to the user based on the user having at least a minimum level of pre-existing knowledge related to the topic of the question.

14. The system of claim 9, wherein the operations further comprise determining a completeness score for the candidate response, wherein the completeness score indicates how completely the candidate response answers the question, wherein the system determines whether to return the candidate response for presentation to the user further based on the completeness score for the candidate response.

* * * * *